United States Patent
Sakhnini et al.

(10) Patent No.: US 12,375,237 B2
(45) Date of Patent: Jul. 29, 2025

(54) REFERENCE SIGNAL DESIGN FOR ZERO-TAIL ORTHOGONAL FREQUENCY DIVISION MULTIPLEXING COMMUNICATIONS

(71) Applicant: QUALCOMM Incorporated, San Diego, CA (US)

(72) Inventors: Iyab Issam Sakhnini, San Diego, CA (US); Hemant Saggar, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 18/046,853

(22) Filed: Oct. 14, 2022

(65) Prior Publication Data

US 2024/0129083 A1     Apr. 18, 2024

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ............. H04L 27/2605; H04L 27/2613; H04L 27/2636; H04L 5/0048; H04W 72/0446
USPC ....................................................... 370/329
See application file for complete search history.

(56) References Cited

U.S. PATENT DOCUMENTS

| | | | |
|---|---|---|---|
| 2010/0086082 A1* | 4/2010 | Ogawa | H04L 27/2626 375/308 |
| 2011/0249548 A1* | 10/2011 | Gaal | H04J 13/0059 375/260 |
| 2012/0250655 A1* | 10/2012 | Noh | H04L 27/2605 370/330 |
| 2018/0367355 A1* | 12/2018 | Pan | H04L 27/2607 |
| 2019/0273643 A1* | 9/2019 | Dong | H04L 25/0202 |
| 2020/0052948 A1* | 2/2020 | Sahin | H04L 27/2607 |
| 2023/0135780 A1* | 5/2023 | Sakhnini | H04L 27/2605 370/329 |
| 2023/0254077 A1* | 8/2023 | Sakhnini | H04L 27/2605 370/329 |
| 2023/0318892 A1* | 10/2023 | Sakhnini | H04L 27/2613 370/329 |
| 2024/0275658 A1* | 8/2024 | Li | H04B 7/0695 |

* cited by examiner

*Primary Examiner* — Robert J Lopata
(74) *Attorney, Agent, or Firm* — Holland & Hart LLP

(57) ABSTRACT

Methods, systems, and devices for wireless communications are described. A transmitting device may generate a first time-domain reference signal sequence of a first sequence length, and may truncate the first sequence length to a second sequence length and may append a header portion and a tail portion to the truncated first time-domain reference signal sequence. The transmitting device may perform a discrete Fourier transform (DFT) on the truncated first time-domain reference signal sequence to generate a frequency-domain reference signal sequence associated with a phase constant, and may perform an inverse fast-Fourier transform (IFFT) on the result of the DFT. The transmitting device may then transmit the result of the IFFT to a receiving device, which may further process the signal by performing a fast-Fourier transform (FFT), dividing by the phase constant, and taking the conjugate of the received sequence.

30 Claims, 21 Drawing Sheets

REFERENCE SIGNAL DESIGN FOR ZERO-TAIL ORTHOGONAL FREQUENCY DIVISION MULTIPLEXING COMMUNICATIONS

FIELD OF TECHNOLOGY

The following relates to wireless communications, including reference signal design for zero-tail (ZT) orthogonal frequency division multiplexing (OFDM) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, wireless devices may communicate in relatively high frequency bands according to one or more different waveform types. For example, a first waveform type may support cyclic prefix-based waveforms and a second waveform type may support guard interval (GI)-based waveforms.

SUMMARY

The described techniques relate to improved methods, systems, devices, and apparatuses that support reference signal design for zero-tail (ZT) orthogonal frequency division multiplexing (OFDM) communications. For example, the described techniques provide for efficient and simplified transmission and reception of ZT guard-interval (GI)-based OFDM communications. For example, some techniques may be performed at a transmitting device so that various Zadoff-Chu (ZC) properties of a reference signal sequence are maintained, which may reduce the complexity for both transmitting and receiving the signal. For example, a transmitting device may generate a truncated reference signal in the time domain by adding zero-bit header portion and zero-bit tail portion to a generated ZC signal. This truncated sequence is still a ZC sequence after truncation, and is processed using a discrete Fourier transform (DFT). The result of the DFT is a ZC sequence multiplied by a known phase constant, and the transmitting device performs inverse fast-Fourier transform processing (IFFT) to further process and transmit the signal to a receiving device. To receive the signal, the receiving device performs a fast Fourier transform (FFT), divides the result by the phase constant, takes the conjugate of the sequence, and then can perform frequency-domain channel estimation on the received signal.

A method for wireless communications at a transmitting device is described. The method may include generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence, performing the DFT on the truncated first time-domain reference signal sequence to generate a frequency-domain reference signal sequence associated with a phase constant, performing an IFFT on the frequency-domain reference signal sequence associated with the phase constant to generate a second time-domain reference signal sequence, and transmitting the second time-domain reference signal sequence.

An apparatus for wireless communications at a transmitting device is described. The apparatus may include a processor, memory coupled with the processor, and instructions stored in the memory. The instructions may be executable by the processor to cause the apparatus to generate a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence, perform the DFT on the truncated first time-domain reference signal sequence to generate a frequency-domain reference signal sequence associated with a phase constant, perform an IFFT on the frequency-domain reference signal sequence associated with the phase constant to generate a second time-domain reference signal sequence, and transmit the second time-domain reference signal sequence.

Another apparatus for wireless communications at a transmitting device is described. The apparatus may include means for generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence, means for performing the DFT on the truncated first time-domain reference signal sequence to generate a frequency-domain reference signal sequence associated with a phase constant, means for performing an IFFT on the frequency-domain reference signal sequence associated with the phase constant to generate a second time-domain reference signal sequence, and means for transmitting the second time-domain reference signal sequence.

A non-transitory computer-readable medium storing code for wireless communications at a transmitting device is described. The code may include instructions executable by a processor to generate a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence, perform the DFT on the truncated first time-domain reference signal sequence to generate a frequency-domain reference signal sequence associated with a phase constant, perform an IFFT on the frequency-domain reference signal sequence associ- ated with the phase constant to generate a second time-domain reference signal sequence, and transmit the second time-domain reference signal sequence.

In some examples of the method, apparatuses, and non-transitory computer-readable medium described herein, the addition of the header portion and the tail portion to the first time-domain reference signal sequence may include operations, features, means, or instructions for truncating the first time-domain reference signal sequence using a first set of multiple zero bits corresponding to the header portion and a second set of multiple zero bits corresponding to the tail portion.

In some examples of the method, apparatuses, and non-transitory computer-readable medium described herein, the first time-domain reference signal sequence and the truncated first time-domain reference signal sequence may be associated with a set of ZC properties and the method, apparatuses, and non-transitory computer-readable medium may include further operations, features, means, or instructions for performing the DFT on the truncated first time-domain reference signal sequence, where the set of ZC properties may be unchanged between the truncated first time-domain reference signal sequence and an output of the DFT.

In some examples of the method, apparatuses, and non-transitory computer-readable medium described herein, performing the DFT on the truncated first time-domain reference signal sequence may include operations, features, means, or instructions for generating the frequency-domain reference signal sequence via the DFT, where the frequency-domain reference signal sequence corresponds to a conjugate based on the truncated first time-domain reference signal sequence multiplied by the phase constant.

Some examples of the method, apparatuses, and non-transitory computer-readable medium described herein to perform the IFFT may further include operations, features, means, or instructions to reconstruct the first time-domain reference signal sequence associated with the phase constant based on performing the IFFT.

In some examples of the method, apparatuses, and non-transitory computer-readable medium described herein, the reconstructed first time-domain reference signal sequence includes the second time-domain reference signal sequence and may have a third sequence length that includes the header portion and the tail portion.

In some examples of the method, apparatuses, and non-transitory computer-readable medium described herein, the truncated first time-domain reference signal sequence includes a short time-domain reference signal sequence generated to have the second sequence length and the method, apparatuses, and non-transitory computer-readable medium may include further operations, features, means, or instructions for performing the DFT on the short time-domain reference signal sequence to generate the frequency-domain reference signal sequence associated with the phase constant.

In some examples of the method, apparatuses, and non-transitory computer-readable medium described herein, performing the DFT on the short time-domain reference signal sequence may include operations, features, means, or instructions for generating the frequency-domain reference signal sequence, where the frequency-domain reference signal sequence corresponds to a conjugate based on the short time-domain reference signal sequence multiplied by the phase constant.

In some examples of the method, apparatuses, and non-transitory computer-readable medium described herein, the first time-domain reference signal sequence corresponds to a DFT-s-OFDM waveform.

In some examples of the method, apparatuses, and non-transitory computer-readable medium described herein, the first time-domain reference signal sequence includes a root sequence associated with the first sequence length.

In some examples of the method, apparatuses, and non-transitory computer-readable medium described herein, the first time-domain reference signal sequence, the truncated first time-domain reference signal sequence, and the frequency-domain reference signal sequence include ZC reference signal sequences.

A method for wireless communications at a receiving device is described. The method may include receiving, from a transmitting device, a time-domain reference signal sequence including a first sequence that includes a header portion and a tail portion, performing a FFT on the time-domain reference signal sequence to generate a frequency-domain reference signal sequence associated with a phase constant, processing the frequency-domain reference signal sequence by dividing the frequency-domain reference signal sequence by the phase constant and taking a conjugate based on the frequency-domain reference signal sequence, and performing a channel estimation procedure to estimate a channel associated with the frequency-domain reference signal sequence.

An apparatus for wireless communications at a receiving device is described. The apparatus may include a processor, memory coupled with the processor, and instructions stored in the memory. The instructions may be executable by the processor to cause the apparatus to receive, from a transmitting device, a time-domain reference signal sequence including a first sequence that includes a header portion and a tail portion, perform a FFT on the time-domain reference signal sequence to generate a frequency-domain reference signal sequence associated with a phase constant, process the frequency-domain reference signal sequence by dividing the frequency-domain reference signal sequence by the phase constant and taking a conjugate based on the frequency-domain reference signal sequence, and perform a channel estimation procedure to estimate a channel associated with the frequency-domain reference signal sequence.

Another apparatus for wireless communications at a receiving device is described. The apparatus may include means for receiving, from a transmitting device, a time-domain reference signal sequence including a first sequence that includes a header portion and a tail portion, means for performing a FFT on the time-domain reference signal sequence to generate a frequency-domain reference signal sequence associated with a phase constant, means for processing the frequency-domain reference signal sequence by dividing the frequency-domain reference signal sequence by the phase constant and taking a conjugate based on the frequency-domain reference signal sequence, and means for performing a channel estimation procedure to estimate a channel associated with the frequency-domain reference signal sequence.

A non-transitory computer-readable medium storing code for wireless communications at a receiving device is described. The code may include instructions executable by a processor to receive, from a transmitting device, a time-domain reference signal sequence including a first sequence that includes a header portion and a tail portion, perform a FFT on the time-domain reference signal sequence to generate a frequency-domain reference signal sequence associated with a phase constant, process the frequency-domain reference signal sequence by dividing the frequency-domain reference signal sequence by the phase constant and taking a conjugate based on the frequency-domain reference signal sequence, and perform a channel estimation procedure to estimate a channel associated with the frequency-domain reference signal sequence.

In some examples of the method, apparatuses, and non-transitory computer-readable medium described herein, the header portion and the tail portion further include a first set of multiple zero bits corresponding to the header portion and a second set of multiple zero bits corresponding to the tail portion.

Some examples of the method, apparatuses, and non-transitory computer-readable medium described herein may further include operations, features, means, or instructions for performing the FFT on the time-domain reference signal sequence having a set of ZC properties, where the frequency-domain reference signal sequence may be associated with the conjugate that may be based on the time-domain reference signal sequence based on the set of ZC properties.

In some examples of the method, apparatuses, and non-transitory computer-readable medium described herein, performing the FFT on the time-domain reference signal sequence may include operations, features, means, or instructions for generating the frequency-domain reference signal sequence via the FFT, where the frequency-domain reference signal sequence corresponds to the conjugate based on a truncated first time-domain reference signal sequence multiplied by the phase constant.

In some examples of the method, apparatuses, and non-transitory computer-readable medium described herein, the time-domain reference signal sequence corresponds to a DFT-s-OFDM waveform.

In some examples of the method, apparatuses, and non-transitory computer-readable medium described herein, the time-domain reference signal sequence and the frequency-domain reference signal sequence include ZC reference signal sequences.

DETAILED DESCRIPTION

Figure 1:
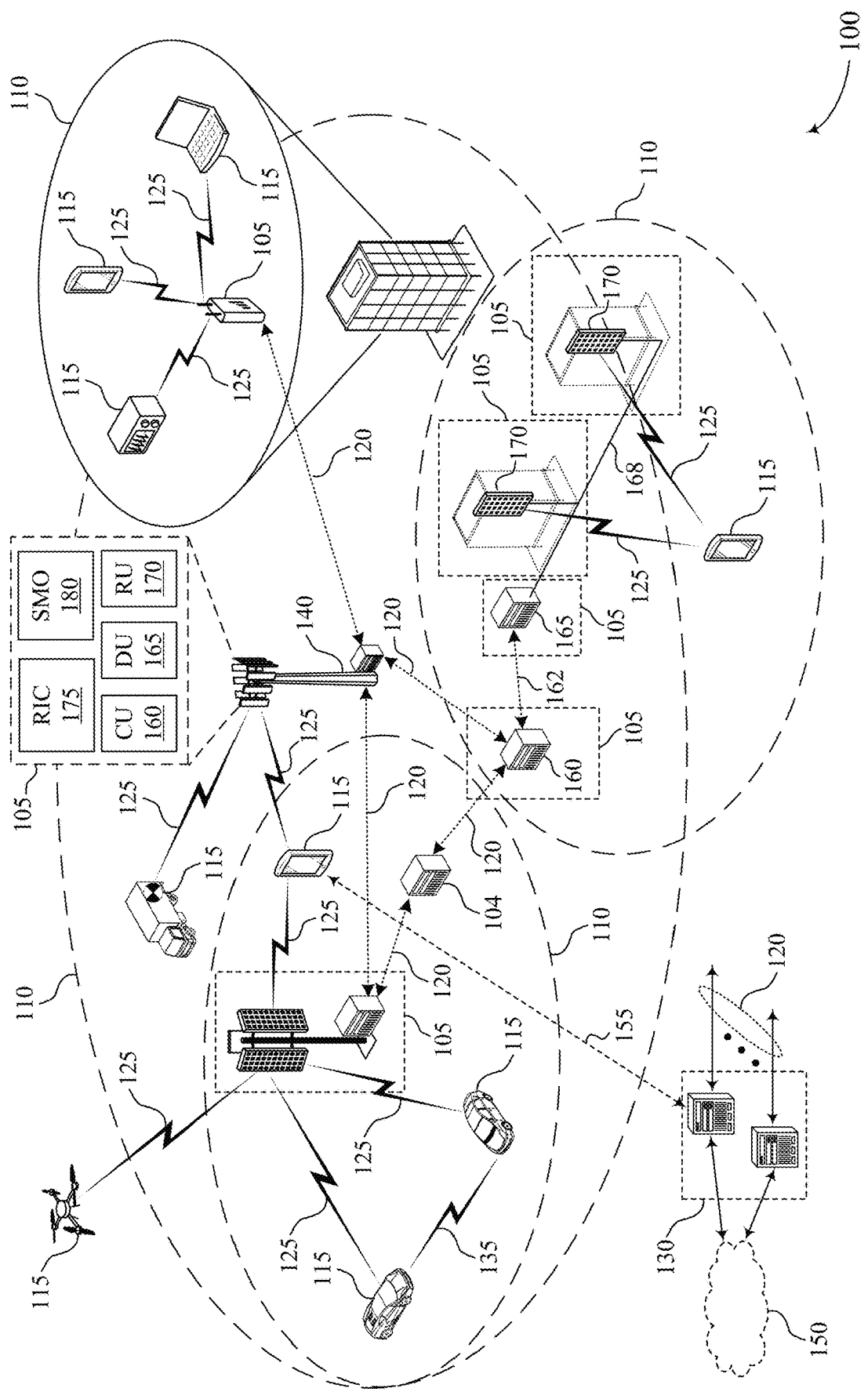
FIGS. 1 and 2 illustrate examples of wireless communications system that supports reference signal design for zero-tail (ZT) orthogonal frequency division multiplexing (OFDM) communications in accordance with one or more aspects of the present disclosure.

Some wireless communications networks may support communications in high frequency bands to increase throughput and available bandwidth for both uplink and downlink signaling between devices. In some implementations, a wireless communications network may implement discrete Fourier transform-spread-orthogonal frequency division multiplexed (DFT-s-OFDM) waveforms to accommodate such high frequency communications. A DFT-s-OFDM waveform, in some examples, may include a guard interval (GI) and a header sequence or a tail sequence (or a combination of these). The header sequence or tail sequence may be added to the beginning or end of a reference signal sequence used to generate the waveform, and may further support added time-frequency tracking, channel estimation, and interference mitigation benefits.

In some cases, to generate a DFT-s-OFDM waveform, a zero head (ZH) header and a zero tail (ZT) tail are appended to the sequence by adding a set of zeros to the beginning and end of the sequence before performing DFT processing. As used in this disclosure, the term "zero bit" refers to a bit set to a value of zero. In some cases, however, the addition of these zeros can change various properties of the sequence used to generate the waveform. For example, if the sequence before addition of the ZH and the ZT is a Zadoff-Chu (ZC) sequence, the addition of the ZH and ZT may change the sequence such that it is no longer has the properties of a ZC sequence, which are useful in channel estimation. This change in sequence properties may increase the complexity for both transmitting and receiving the DFT-s-OFDM sequence.

To support efficient transmission and reception of ZH, various ZT GI-based DFT-s-OFDM sequence generation techniques may be performed at a transmitting device so that the ZC properties of the reference signal sequence are maintained, while also reducing complexity for the receiver. The transmitting device may generate a "truncated" reference signal in the time domain by truncating the ZC sequence (e.g., removing a set of bits from the head and tail of the ZC sequence) and adding zero-bit header samples and zero-bit tail samples to the truncated ZC sequence. This truncated sequence is still a ZC sequence after truncation and after addition of the zero head and zero tail, and is processed using DFT. The result of the DFT is a ZC sequence multiplied by a known phase constant, and takes advantage of the mathematical property that a DFT of a ZC sequence is also a ZC sequence. After DFT is performed, the transmitting device performs an IFFT and transmits the signal to the receiving device.

To receive and process the signal, the receiving device performs an FFT, divides by the phase constant, takes the conjugate of the sequence, and then performs frequency-domain channel estimation on the received signal. These signal processing techniques may significantly reduce the computational complexity at both the receiving and transmitting devices, since the transmitted and received signal is a ZC sequence multiplied by the known phase constant. The signal processing techniques described herein may reduce the computational complexity at both the receiving and transmitting devices, while reducing power expenditure and further supporting the use of DFT-s-OFDM waveforms in high frequency networks.

Aspects of the disclosure are initially described in the context of wireless communications systems. Aspects of the disclosure are further illustrated by and described with reference to symbol structures, OFDM symbol generation techniques, a process flow, apparatus diagrams, system diagrams, and flowcharts that relate to reference signal design for ZT OFDM communications.

FIG. 1 illustrates an example of a wireless communications system 100 that supports reference signal design for ZT OFDM communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support reference signal design for ZT OFDM communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE 115 and a network entity 105 may communicate over a relatively high operating frequency band, such as frequency range two (FR2) bands or new-radio (NR) operating bands, using waveforms that support uplink communications, downlink communications, or both. In some cases, UE 115 and a network entity 105 may use multiple different types of waveforms, which may include GI-based OFDM waveforms, cyclic prefix (CP)-OFDM waveforms, single carrier frequency domain waveforms (e.g., DFT-s-OFDM), a single carrier time domain waveforms (e.g., single carrier quadrature amplitude modulation (SC-QAM)), or any combinations thereof. Such waveforms may support communications in the relatively high operating frequency bands by having relatively low PAPR, and by at least partially mitigating the effects of high phase noise and increased UE complexity.

(CP)-OFDM waveforms may be CP-based waveforms that have a relatively high complexity and may implement higher order MIMO communications. In some examples, (CP)-OFDM waveforms may support single tap frequency domain equalization (FDE), efficient FDM, increased subcarrier spacing, and efficient bandwidth utilization. SC-QAM waveforms for time domain implementations may be CP-based or GI-based and include a guard band. SC-QAM waveforms may also support single tap FDE or time domain equalization (TDE) and efficient FDM, may have relatively low SNR and low PAPR, and may have relatively low complexity. DFT-s-OFDM waveforms for frequency-domain implementations may be CP-based or GI-based and may support single tap FDE and efficient FDM, may have relatively low PAPR. DFT-s-OFDM waveforms may also support efficient bandwidth utilization and may have relatively higher complexity.

Wireless communications system 100 may support communications using a DFT-s-OFDM waveform, which may include a GI, a header sequence or a tail sequence (or a combination of these), which may be added to the beginning or end of a reference signal sequence used to generate the waveform. To generate a DFT-s-OFDM waveform, ZH and a ZT are appended to the sequence by adding a set of zeros to the beginning and end of the sequence before performing DFT processing. In some cases, however, the addition of these zeros can change the ZC properties of the reference signal sequence.

To support efficient transmission and reception of ZH, ZT GI-based DFT-s-OFDM reference signals, a transmitting device may generate a "truncated" reference signal in the time domain by truncating the ZC sequence (e.g., removing a set of bits from the head and tail of the ZC sequence) and adding zero-bit header samples and zero-bit tail samples to the truncated ZC sequence. This truncated sequence is still a ZC sequence after truncation and after addition of the zero head and zero tail, and is processed using DFT. The result of the DFT is a ZC sequence multiplied by a known phase constant, and after DFT is performed, the transmitting device performs IFFT and transmits the signal to the receiving device. To receive and process the signal, the receiving device may perform an FFT, divide by the phase constant, and take the conjugate of the sequence to recover the transmitted sequence. The receiving device may then perform frequency-domain channel estimation on the received signal. These signal processing techniques may significantly reduce the computational complexity at both the receiving and transmitting devices, because the transmitted and received signals are a ZC sequence multiplied by the known phase constant.

Figure 2:
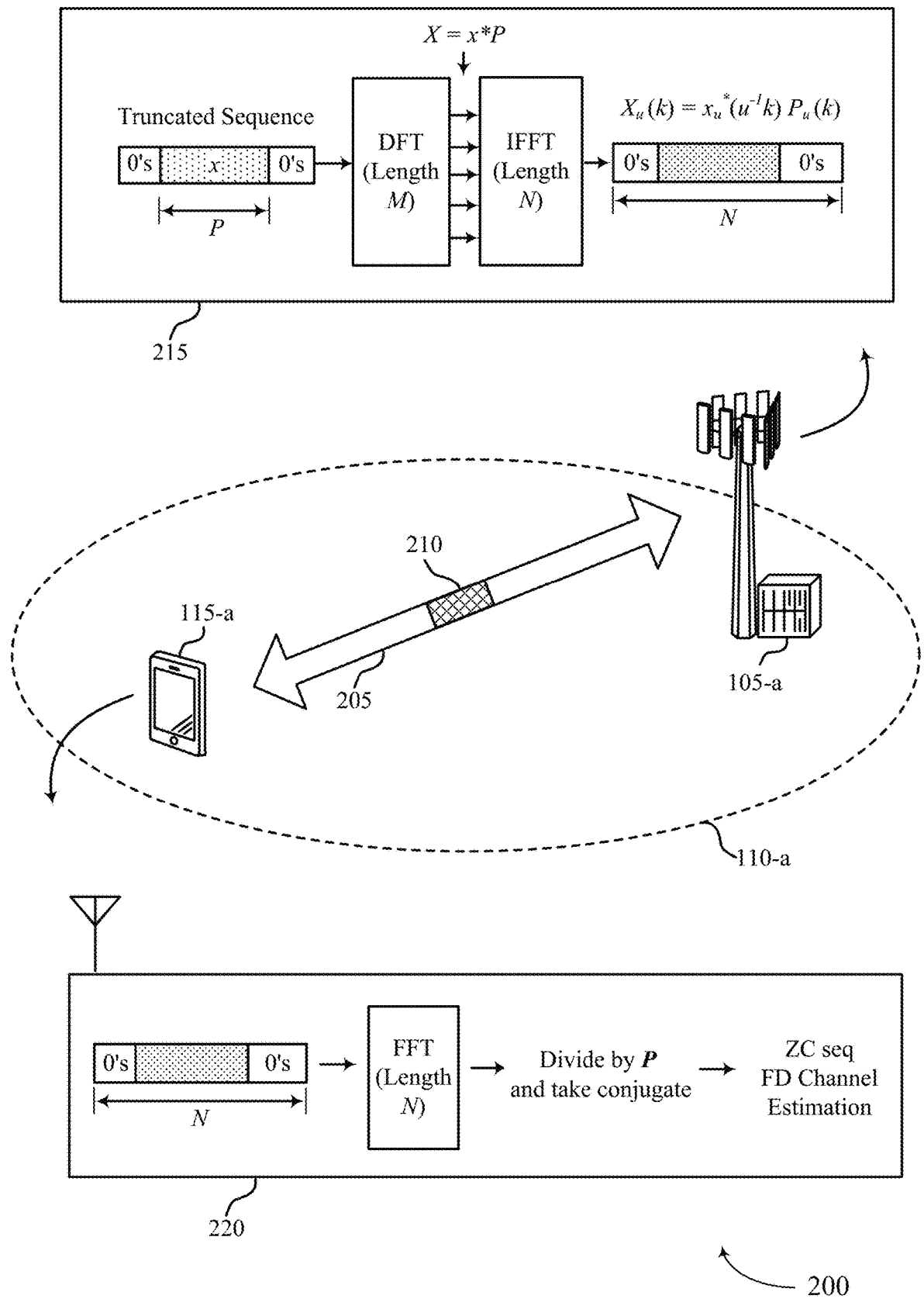

FIG. 2 illustrates an example of a wireless communications system 200 that supports reference signal design for ZT OFDM communications in accordance with one or more aspects of the present disclosure. The wireless communications system 200 may include a network entity 105-a and a UE 115-a, which may represent examples of a network entity 105 and a UE 115 as described with reference to FIG. 1. The network entity 105-a and the UE 115-a may communicate within a geographic coverage area 110-a and via a communication link 205. In some examples, the network entity 105-a and UE 115-a may be examples of transmitting and receiving devices described herein, and may communicate using ZT GI-based DFT-s-OFDM communications 210.

Wireless communications system 200 may operate in high frequency bands to increase throughput and available bandwidth using, for example, DFT-s-OFDM waveforms. Such DFT-s-OFDM symbols may include a GI, header sequences, or tail sequences (or a combination thereof), which are added to the beginning or end of a reference signal sequence used to generate the waveform, and for added time-frequency tracking, channel estimation, and interference mitigation benefits.

In some cases, to generate a DFT-s-OFDM waveform, a header and a tail are appended to the sequence by adding a set of zeros to the beginning and end of the sequence before performing the DFT (e.g., a ZT and a ZH). The addition of these zeros, however, may change various properties of the sequence used to generate the waveform. For example, if the sequence before addition of the ZH and ZT is a ZC sequence, it may no longer be a ZC sequence after the addition of the zero-head and zero-tail, which may impact signaling performance.

To generate ZH, ZT sequences at a transmitting device such that the ZC properties of the reference signal sequence are maintained, and to reduce receiver processing complexity, the transmitting device may perform a method 215 for generating a "truncated" reference signal in the time domain. For example, the transmitting device may truncate the ZC sequence (e.g., by removing a set of bits from the head and tail of the ZC sequence) and adding zero-bit header samples and zero-bit tail samples to the truncated ZC sequence. For example, the network entity 105-a may generate a ZC sequence and may truncate the sequence to be length P and may add the ZH and the ZT to the truncated sequence. This truncated sequence (including the ZH and ZT) is still a ZC sequence after truncation, and is processed using DFT of length M to generate the sequence $X_u(k)=x_u*(u^{-1}k)P_u(k)$. The result of the DFT is a ZC sequence $(x_u*(u^{-1}k))$ multiplied by a known phase constant $P_u(k)$, which leverages the mathematical property that the DFT of a ZC sequence is also a ZC sequence. After DFT is performed, the network entity 105-a performs IFFT and transmits the signal to the UE 115-a. Then, the UE 115-a may perform receiver processing 220 by performing FFT on the ZH ZT received signal having length N, divides by the phase constant $P_u(k)$, takes the conjugate of the sequence, and then can perform frequency-domain channel estimation on the received signal.

The signal processing techniques described herein may reduce the computational complexity at both the receiving and transmitting devices, since the transmitted and received signal is a ZC sequence multiplied by a known phase. The described techniques may also reduce power expenditure (for both the network entity 105-a and the UE 115-a) and may also support DFT-s-OFDM waveform utilization in high frequency networks.

Figure 3:
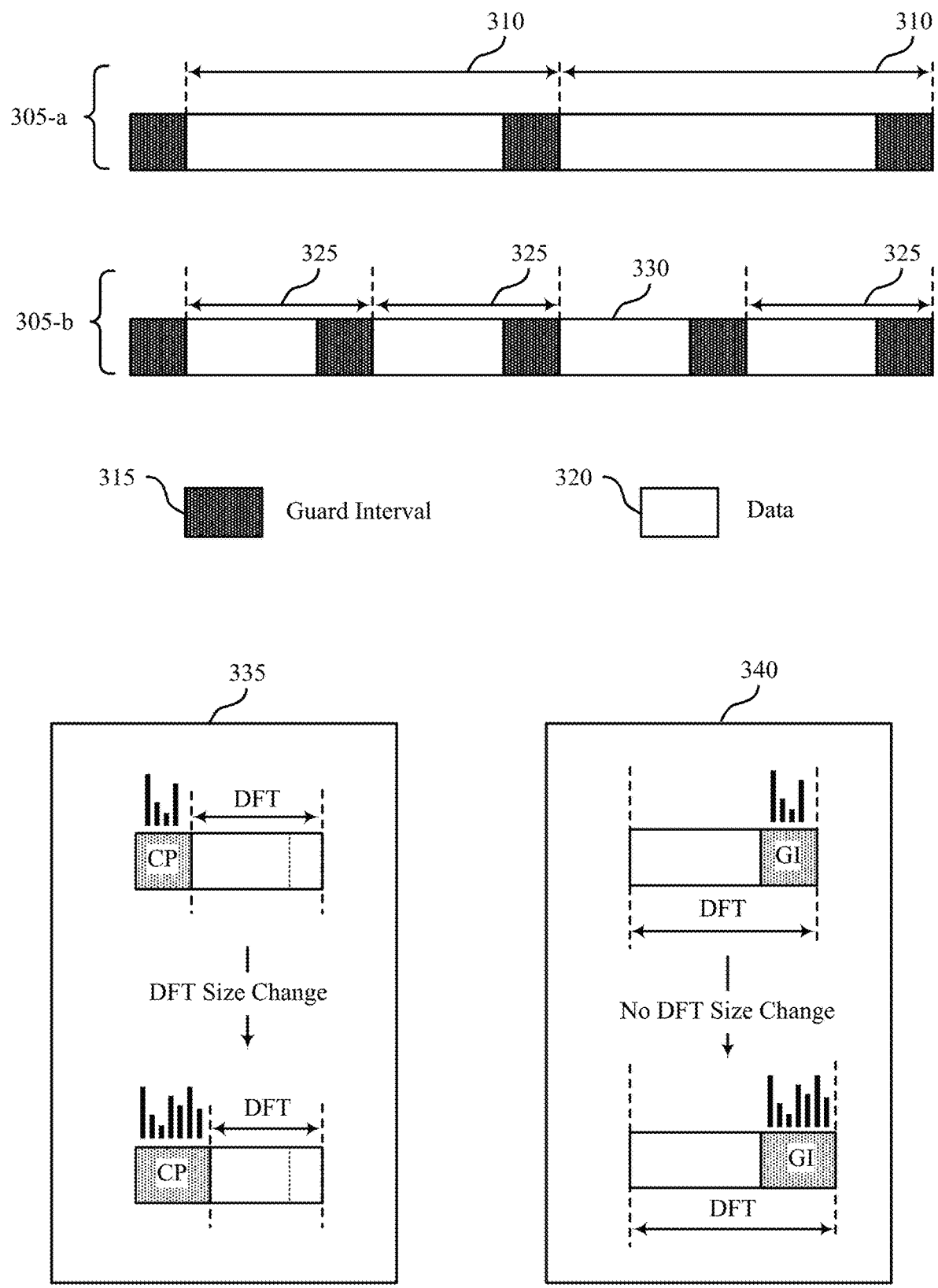
FIG. 3 illustrates an example symbol structures that support reference signal design for ZT OFDM communications in accordance with one or more aspects of the present disclosure.

FIG. 3 illustrates an example of symbol structures 300 that support reference signal design for ZT OFDM communications in accordance with one or more aspects of the present disclosure. The symbol structures 300 may represent example configurations for communications between a transmitting device and a receiving device such as a UE 115 and a network entity, which may be examples of a UE 115 and a network entity 105 as described with reference to FIGS. 1 and 2.

In the example of FIG. 3, a first symbol configuration 305-a may be a GI-based structure in which symbols 310 each have an associated GI 315. A second symbol configuration 305-b may also be a GI-based structure in which symbols 325 each have an associated GI 315. Data 320 may be transmitted in each symbol 310, 325. In this example, the first symbol configuration 305-a may indicate a first symbol duration for symbols 310, and a second symbol configuration 305-b may indicate a second symbol duration for symbols 325. In some cases, the network entity may indicate a location and contents of an additional period 330 to the UE via the configuration for the second symbol configuration 305-b, or via other control signaling. The additional period 330 may be used for transmission of data, one or more reference signals, or both.

In the example of FIG. 3, the symbol structures 300 may provide non-slot contained GI-based symbol formats. A slot that is configured according to the symbol structures 300 may include a quantity of symbols that each include data 320 (e.g., 15 OFDM symbols per slot) and a corresponding GI 315. A GI 315 for a first symbol in a slot may be included in a prior slot. A transmitting device may configure the GIs 315 by inserting a sequence of data (e.g., known data) into each symbol in the slot before. As such, the information in each GI 315 may be utilized for synchronization, channel estimation, phase tracking, or other applications, which may reduce overhead as compared with cyclic prefix-based symbol formats. In some cases, the GI 315 may vary symbol-to-symbol in a slot, and the symbol duration and FFT window size may remain constant. The GI-based symbol structures 300 may thereby adapt to delay spreads without changing a symbol duration, which may provide for improved communication reliability and reduced latency.

A GI 315 may be implemented in multiple ways. For example, a ZT GI may be implemented, where zeros are appended at the end (and possibly the beginning) of the symbols 310, 325. In other examples, a unique-word (UW) GI may be implemented, where some known signal or sequence is appended at the end (and possibly the beginning) of modulation symbols.

In addition to GI-based symbol formats, a wireless device may additionally or alternatively support communications using a cyclic-prefix (CP)-based symbol format, such as a slot format in delay spread adaptation 335. Performing FFT or DFT on a CP-based symbol may change the DFT size. In some other implementations, for example, in delay spread adaptation 340 the DFT size remains the same for a GI-based symbol format.

In some examples, the GI 315 may be a ZT GI, which may be added to a ZC sequence of data 320. To support accurate and efficient DFT processing, some techniques may be performed at a transmitting device so that various the ZC properties of the ZC sequence are maintained. For example, a transmitting device may generate a truncated reference signal in the time domain by truncating the ZC sequence (e.g., by removing a set of bits from the head and tail of the ZC sequence) and adding zero-bit header samples and zero-bit tail samples to the truncated ZC sequence. The result of the DFT on the truncated ZC sequence is a ZC sequence multiplied by a known phase constant.

Figure 4:
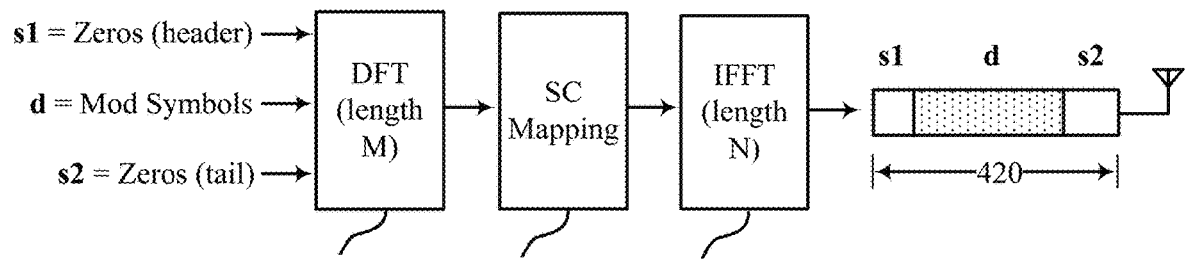
FIGS. 4-7 illustrate examples of OFDM symbol generation techniques that support reference signal design for ZT OFDM communications in accordance with one or more aspects of the present disclosure.
Figure 4:
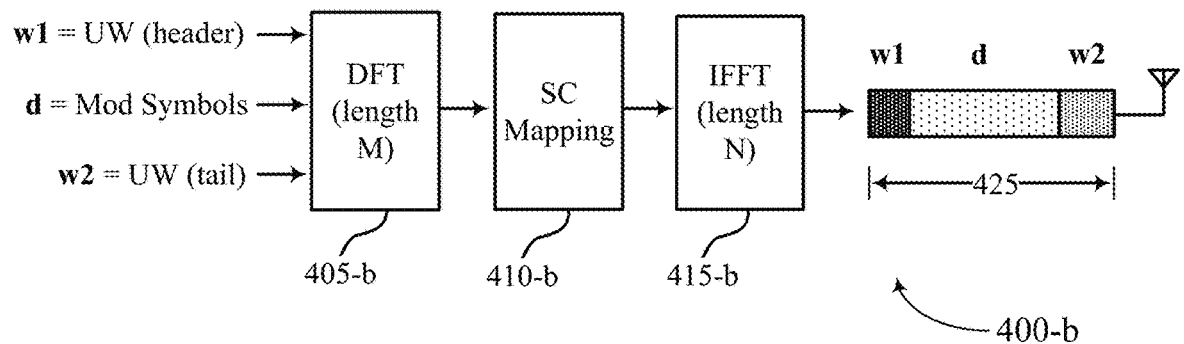
Figure 4:
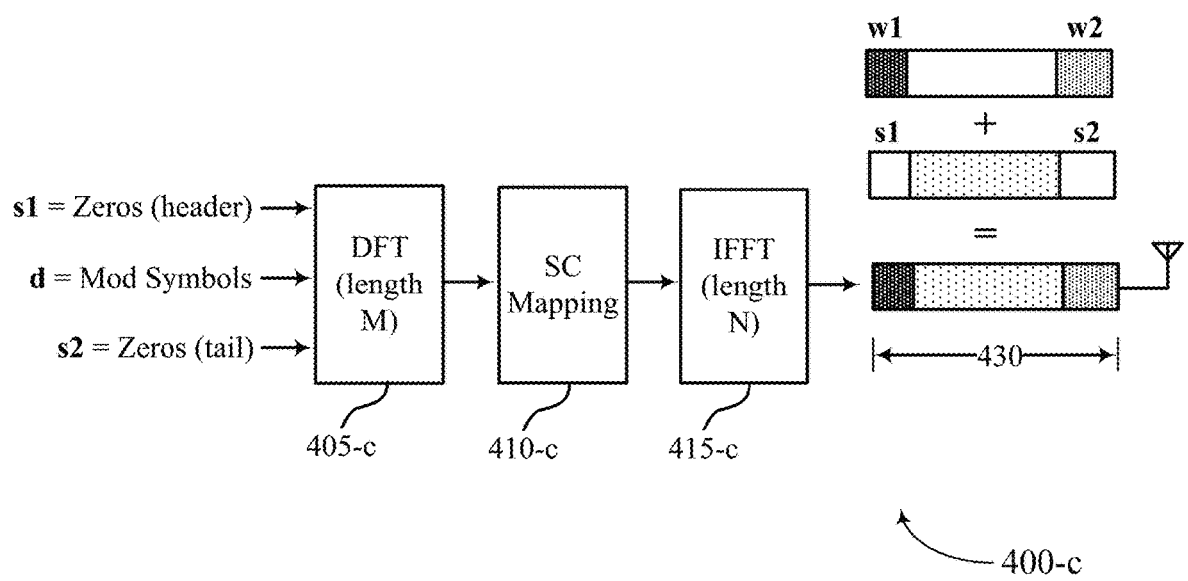

FIG. 4 illustrates an example of OFDM symbol generation techniques 400-a, 400-b, and 400-c that support reference signal design for ZT OFDM communications in accordance with one or more aspects of the present disclosure. The OFDM symbol generation techniques 400-a, 400-b, and 400-c may represent examples of ZT GI-based DFT-s-OFDM generation methods as described herein.

OFDM symbol generation technique 400-a may implement a ZT-GI. To create a ZT-GI, zeros (e.g., zero vectors) may be inserted into the head and tail of the data before DFT process. For example, a zero header (ZH) (s1) and a ZT (s2) may be appended to modulated symbols (d) before being processed by DFT 405-a, SC mapping 410-a, and IFFT 415-a. The OFDM symbol 420 is generated including the ZH (s1) and the ZT (s2), appended to the modulated symbols (d). The addition of the ZH and the ZT may add gaps between symbols to reduce interference and align symbols in a frame, and may support efficient signal multiplexing.

OFDM symbol generation technique 400-b may implement a UW-GI, which may utilize a flexible internal guard band. The zero tails and heads of the ZT-DFT-s-OFDM may be replaced by one or more fixed sequences (e.g., w1 and w2) which may enhance cyclic properties of the signal. The header w1 and the tail w2 may be inserted before being processed by DFT 405-b, SC mapping 410-b, and IFFT 415-b. The OFDM symbol 425 is generated including the w1 header and the w2 tail, which are appended to the modulated symbols (d). The UW approach may allow the GI to be used for frequency tracking and estimation.

OFDM symbol generation technique 400-c may also implement a UW-GI, and may be generated by separately producing symbols with ZH and ZT, appended to a symbol having a head and tail which include one or more fixed sequences. A zero header (ZH) (s1) and a ZT (s2) may be appended to modulated symbols (d) before being processed by DFT 405-c, SC mapping 410-c, and IFFT 415-c. The OFDM symbol 430 is generated including the ZH (s1) and the ZT (s2), appended to the modulated symbols (d), which may be further appended to a symbol including a head and a tail having the one or more fixed sequences w1 and w2. In such cases, the zero tails and heads of the ZT-DFT-s-OFDM may be replaced by one or more fixed sequences (e.g., w1 and w2) to support a UW-GI.

In some examples, a transmitting device may implement various techniques so that the ZH ZT sequence may be generated, transmitted, and received with reduced complexity. For example, the transmitting device may generate the OFDM symbol 420 using a truncated or shortened reference signal sequence that is appended with the ZH s1 and the ZT s2. The result of the DFT 405-a, the SC mapping 410-a and the IFFT 415-a may be a ZC sequence multiplied by a known phase constant based on use of the truncated or shortened reference signal sequence.

Figure 5:
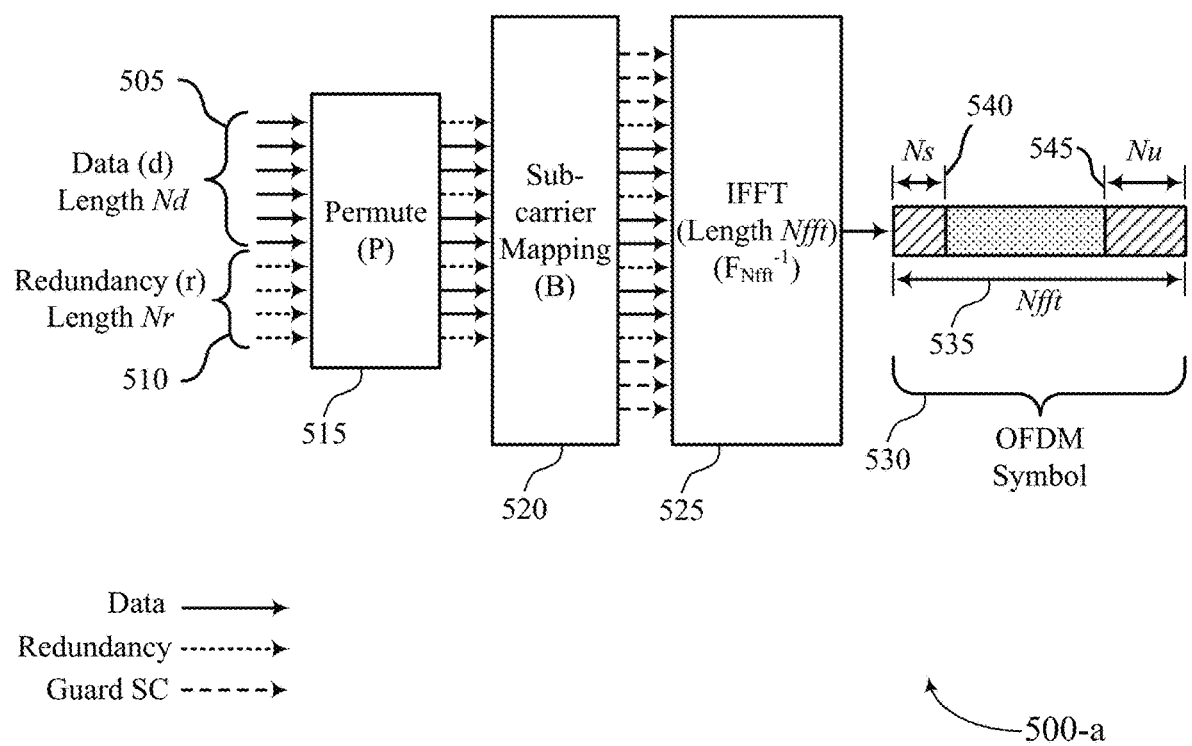
Figure 5:
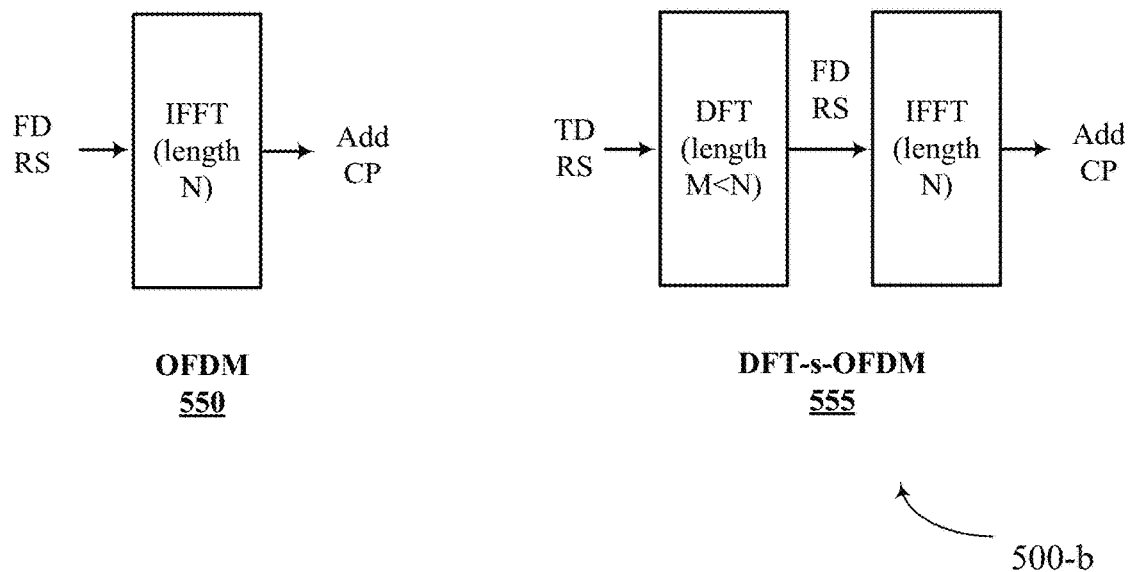

FIG. 5 illustrates an example of OFDM symbol generation techniques 500-a and 500-b that support reference signal design for ZT OFDM communications in accordance with one or more aspects of the present disclosure. The OFDM symbol generation techniques 500-a and 500-b may represent examples of ZT GI-based DFT-s-OFDM generation methods as described herein.

In the example of OFDM symbol generation technique 500-a, a UW may be used for the GI, where the UW is spread along with data 505 (having length Nd) for the symbol, with the GI samples provided in redundant sub-carriers 510, having a length Nr. In this example, the GI (e.g. a tail and optionally a header GI) may be provided along with data to a permutation matrix (P) 515. A subcarrier mapping matrix 520 (e.g., mapping matrix B) may be applied to the permuted samples and the mapped output provided to IFFT 525 (e.g., for an IFFT of length Nfft, represented by matrix $F_{Nfft}^{-1}$). The output of IFFT 525 may provide an OFDM symbol 530 having a length (Nfft) 535 having data of length x and with a GI that has a head 540 (of length Ns) and a tail 545 (of length Nu, where Ns+Nu is the total GI length). In some cases, the head 540 and a tail 545 may be a zero-head and a zero-tail.

In the systematic approach for generating the GI, redundant sub-carriers 510 are inserted at the IFFT 525 input, where a number of such subcarriers (e.g., Nr) is dependent on data (d) length (e.g., Nd) and number of redundant sub-carriers 510 (Nr). As discussed herein, mapping the redundancy subcarriers into the IFFT 525 input may have an impact on power requirements for transmission of the OFDM symbol 530. For example, selection of unoptimized locations or mapping may yield a relatively high energy at the IFFT 525 output, requiring relatively high power requirements that may not be sustainable by the transmitting device. In accordance with various aspects discussed herein, the permutation (P) matrix 515 may be provided to manage the possible energy increase at the IFFT 525 output. The IFFT 525 output may be represented by (assuming no head GI and thus no Ns):

$$\begin{bmatrix} x \\ u \end{bmatrix} = F_N^{-1} BP \begin{bmatrix} d \\ r \end{bmatrix},$$

where $F_N^{-1}$ is IFFT of length N, and B is the subcarrier mapping. If $M = F_N^{-1} BP$, then this can be represented as:

$$\begin{bmatrix} x \\ u \end{bmatrix} = \begin{bmatrix} M_{11} & M_{12} \\ M_{21} & M_{22} \end{bmatrix} \begin{bmatrix} d \\ r \end{bmatrix}, u = M_{21}d + M_{22}r$$

and r estimate=$\hat{r}=M_{22}^+(u-M_{21}d)$, where $M_{22}^+$ is the pseudo-inverse of $M_{22}$. In some cases, other ways to get $\hat{r}$ can also be used (e.g., QR factorization, SVD, etc.). In cases where a header GI sample is present, s is of length Ns, x is of length Nx, u is of length Nu, and the following model may be used:

$$\begin{bmatrix} s \\ x \\ u \end{bmatrix} = M \begin{bmatrix} d \\ r \end{bmatrix}, \text{ where } M = F_N^{-1} BP,$$

Where s is the header samples of length Ns, and thus:

$$\begin{bmatrix} s \\ x \\ u \end{bmatrix} = \begin{bmatrix} M_{11} & M_{12} \\ M_{21} & M_{22} \\ M_{31} & M_{32} \end{bmatrix} \begin{bmatrix} d \\ r \end{bmatrix} \rightarrow \begin{bmatrix} s \\ u \end{bmatrix} = \begin{bmatrix} M_{11} & M_{12} \\ M_{31} & M_{32} \end{bmatrix} \begin{bmatrix} d \\ r \end{bmatrix}$$

In some cases, r can be estimated, such as using the approach:

$$\hat{r} = \begin{bmatrix} M_{12} \\ M_{32} \end{bmatrix}^{+} \left( \begin{bmatrix} s \\ u \end{bmatrix} - \begin{bmatrix} M_{11} \\ M_{31} \end{bmatrix} d \right),$$

where $(.)^{+}$ is the pseudo-inverse.

Other possible approaches for such an estimate include QR decomposition and SVD.

In some examples, determination of the permutation matrix (P) may provide for manageable energy increase at the IFFT 525 output. For example, if an identity matrix is used as P, the redundant subcarriers have a relatively high energy that in some cases may not be supported by a transmitting device.

In the example of OFDM symbol generation technique 500-a, a reference signal (e.g., DMRS, CSI-RS, etc.) may be generated for CP-based waveforms in the frequency domain for OFDM (e.g., OFDM technique 550) or DFT-s-OFDM or in pre-DFT time domain for DFT-s-OFDM (e.g., DFT-s-OFDM technique 555). For OFDM technique 550, a device performs IFFT on a frequency-domain reference signal to generate an OFDM symbol, and a CP is added to the IFFT symbol. For DFT-s-OFDM technique 555, DFT is performed on a time-domain reference signal to produce a frequency-domain reference signal. A IFFT is then performed on the frequency-domain reference signal to produce a time-domain reference signal, to which a CP is added.

In some examples, the RSs may be ZC-based RSs, generating the reference signal in time-domain or in frequency domain. In either case, the DFT of ZC is also a ZC, maintaining the same low PAPR. For example, for a reference signal such as a DMRS, a device may use the FD version of the reference signal to estimate the channel and perform FD equalization, which may simplify or reduce complexity for processing reference signals at the receiver.

In some cases, however, for ZT GI-based DFT-s-OFDM waveforms, zeros are appended pre-DFT, and if the reference signal is generated in the time domain pre-DFT, appending zeros to the sequence (e.g., adding a ZH, a ZT, or both) may change the sequence (e.g., one or more sequence properties such as ZC properties), such that the sequence may not have the same desired sequence properties (e.g., ZC properties) and corresponding low PAPR in the frequency domain. This change in sequence properties may increase complexity for channel estimation in the frequency domain (for example, channel estimation using DMRS) and may also increase the complexity for receiving reference signaling at the receiver end. To effectively maintain desirable sequence properties and reduce signaling complexity, a device may support different techniques to generate RSs for ZT GI-based symbols in DFT-s-OFDM waveforms. Such techniques may maintain ZC properties for ZH and ZT waveforms.

Figure 6:
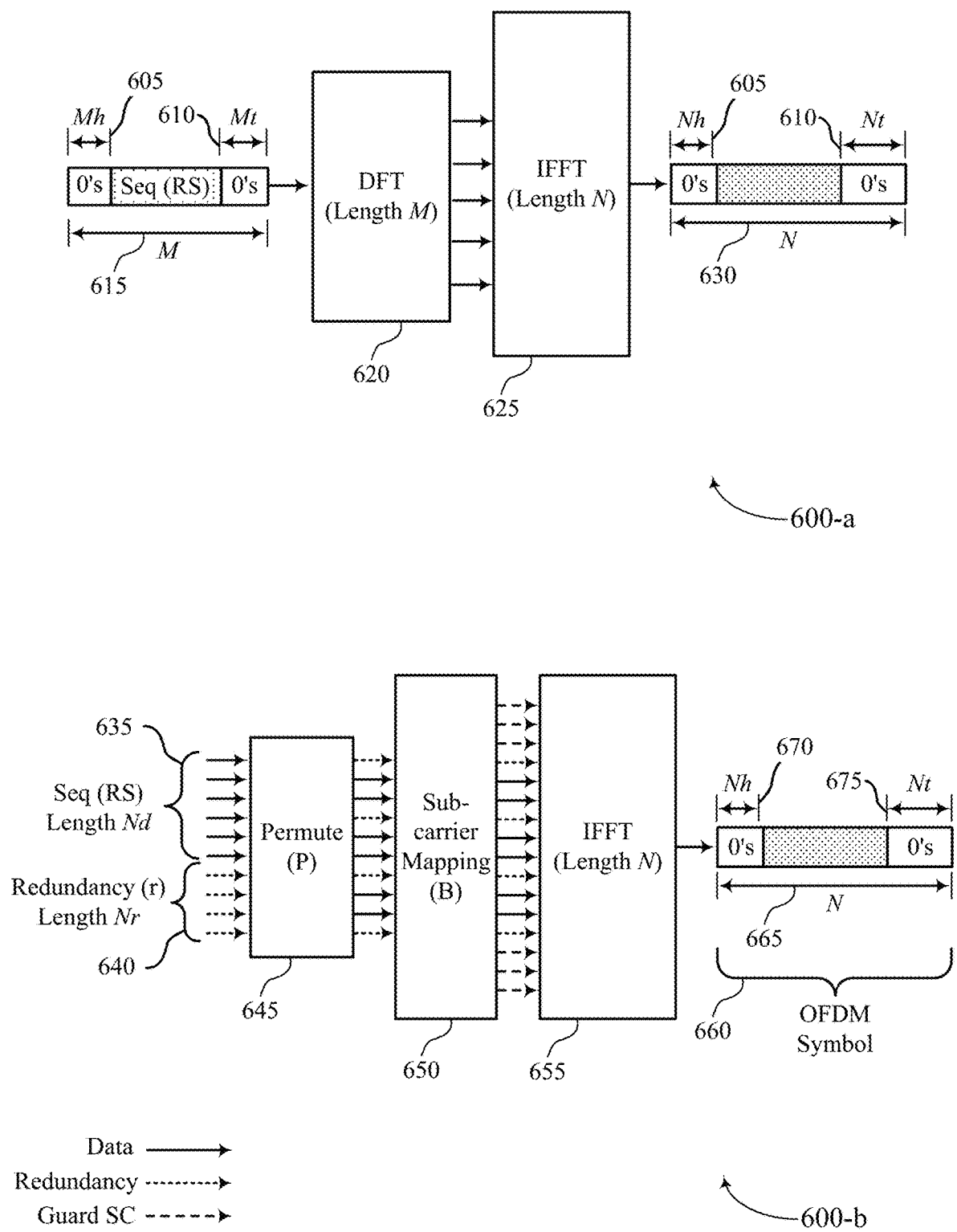

FIG. 6 illustrates an example of OFDM symbol generation techniques 600-a and 600-b that support reference signal design for ZT OFDM communications in accordance with one or more aspects of the present disclosure. The OFDM symbol generation techniques 600-a and 600-b may represent examples of ZT GI-based DFT-s-OFDM generation methods as described herein.

In a first OFDM symbol generation technique 600-a, a reference signal sequence for ZH GI-based DFT-s-OFDM, ZT GI-based DFT-s-OFDM, or both, may be generated in the time domain pre-DFT. For example, the ZH or ZT may be appended to the reference signal sequence before DFT is performed. A transmitting device may append a ZH 605 (e.g., Mh 605) and a ZT 610 (e.g., Mt 610) to the reference signal sequence (e.g., Seq (RS)) to generate a pre-DFT sequence having length M at 615. The transmitting device then performs DFT on the ZH ZT reference signal sequence at 620, followed by IFFT at 625 to generate a time-domain sequence having length N at 630. The time-domain sequence may have the ZH 605 (e.g., Nh 605) and the ZT 610 (e.g., Nt 610) post-IFFT. The transmitting device may transmit the time domain reference signal to a receiving device, which may perform FFT and IDFT along with channel estimation to process the transmitted RS.

In a second OFDM symbol generation technique 600-b, a reference signal sequence for ZH GI-based DFT-s-OFDM, ZT GI-based DFT-s-OFDM, or both, may be generated in the frequency-domain. In the example of OFDM symbol generation technique 500-a, a data reference signal sequence 635 (having length Nd) is generated for the symbol, with the GI samples provided in redundancy carriers 640, having a length Nr. In this example, the GI (e.g. ZT and a ZH) may be provided along with data to a permutation matrix (P) 645. A subcarrier mapping matrix 650 (e.g., mapping matrix B) may be applied to the permuted samples and the mapped output provided to IFFT 655 (e.g., for an IFFT of length N). The output of IFFT 635 may provide an OFDM symbol 660 having a length (N) 665 having a data portion and with a GI that has ZH 670 (of length Nh) and a ZT 675 (of length Nt).

Figure 7:
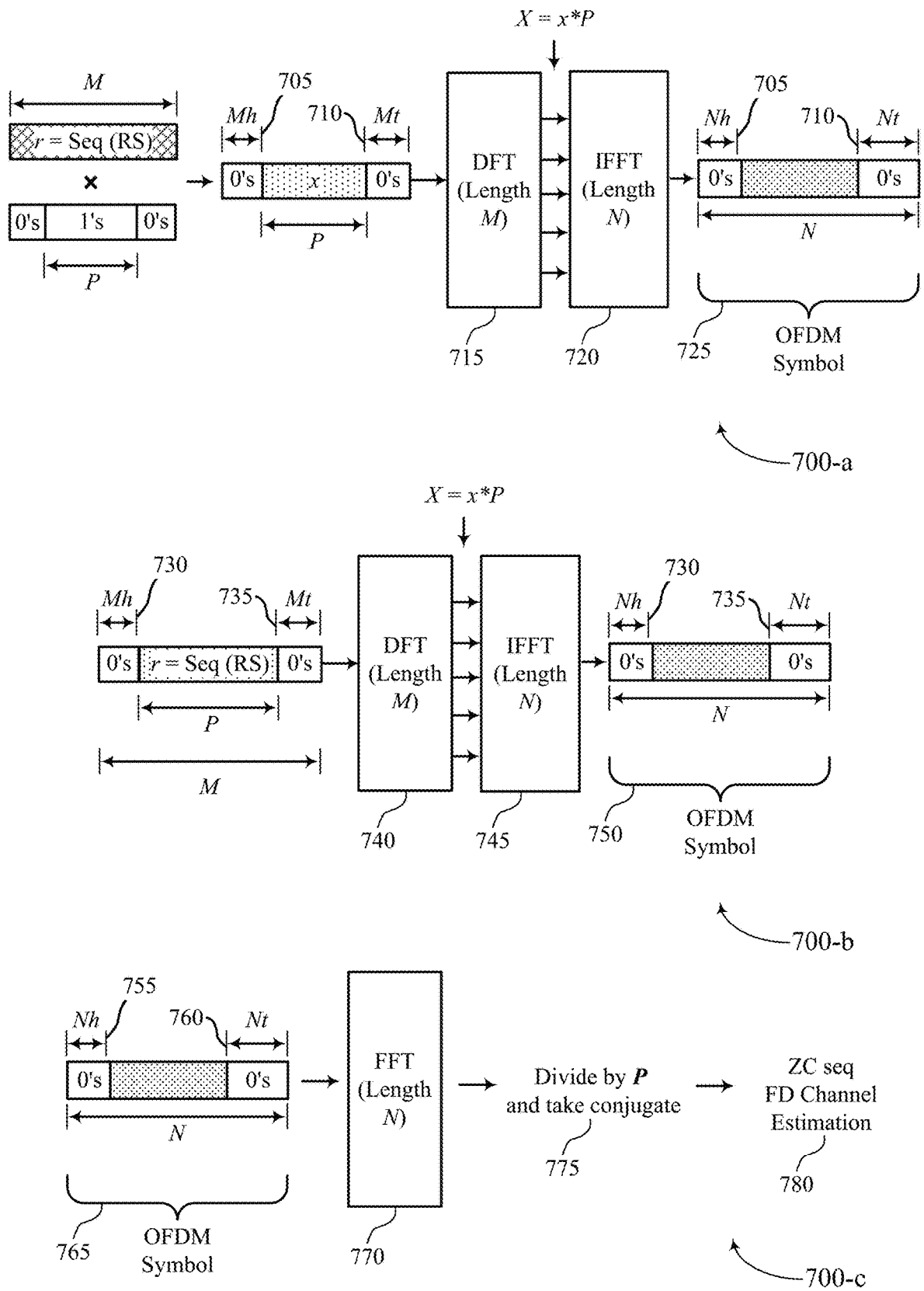

FIG. 7 illustrates an example of OFDM symbol generation techniques 700-a, 700-b, and 700-c that support reference signal design for ZT OFDM communications in accordance with one or more aspects of the present disclosure. The OFDM symbol generation techniques 700-a and 700-b may represent examples of ZT GI-based DFT-s-OFDM generation methods as described herein.

OFDM symbol generation technique 700-a may support a method for generating a truncated reference signal in the time domain by truncating the ZC sequence (e.g., by removing a set of bits from the head and tail of the ZC sequence M) and adding zero-bit header samples (Mh) and zero-bit tail samples (Mt) to the truncated ZC sequence. At first step, a transmitting device may generate a time-domain ZC sequence of length M (e.g., the sequence may be denoted as $r_u(m)$, where u is the root, m=0, ..., M−1, and M is the DFT size). At a next step, the transmitting device may generate the truncated ZC sequence $x_u(m)$ having size P, and add the first Mh header samples 705 and Mt last tail samples 710 of $r_u(m)$ as a ZH and ZT, respectively. For example, $x_u(m)$ may be expressed as:

$$x_u(m) = \begin{cases} 0 & m = 0, \ldots, Mh \\ r_u(m) & m = Mh+1, \ldots, M-Mt-1 \\ 0 & m = M-Mt, \ldots, M-1 \end{cases}$$

Where the remaining P samples (P=M−Mh−Mt) are the truncated ZC reference signal sequence.

After generating the truncated sequence, $x_u(m)$, at 715, the transmitting device may perform the DFT on $x_u(m)$. For example, $X_u(k)$ (the DFT of $x_u(m)$) may be written as a ZC sequence $(x_u*(u^{-1}k))$ multiplied by a phase constant term $P_u(k)$:

$$X_u(k) = x_u*(u^{-1}k) P_u(k)$$

Where k=0, ..., M−1, and $u^{-1}$ is the modular multiplicative inverse of u. The phase constant term $P_u(k)$ may be a known constant term. or may be calculated as:

$$P_u(k) = \sum_{p=0}^{P-1} \exp\left(-\frac{j\pi u(p+u^{-1}k)(p+u^{-1}k+1)}{M}\right).$$

At 720, the transmitting device may perform IFFT on the ZC sequence associated with the phase constant to produce OFDM symbol 725 having a length N with ZH size Nh and ZT size Nt. The transmitting device then transmits the time-domain reference signal sequence to a receiving device. The receiving device may recover $x_u*(u^{-1}k)$ in the frequency domain by performing FFT on the received time domain signal, and using it for channel estimation in a simple frequency-domain channel by taking the conjugate of the received reference signal sequence and dividing the FFT of the received time domain symbol by the known phase constant $P_u(k)$.

OFDM symbol generation technique 700-b may support a method for generating a short reference signal sequence in the time domain and appending ZH and ZT samples to the short reference signal sequence for use in DFT processing. In a first step, the transmitting device may generate a shortened time domain ZC sequence of length P, (e.g., the sequence may be denoted ($r_u(p)$, where u: is the root, p=0, . . . , P−1, P, and P=M−Mh−Mt, and where M is the DFT size). The transmitting device may generate the ZT shortened reference signal sequence $x_u(m)$ by appending Mh zero header samples 730 and Mt zero tail samples 735 to $r_u(p)$. For example, $x_u(m)$ may be expressed as:

$$x_u(m) = [0_{Mh}, r_u(p), 0_{Mt}].$$

The transmitting device may perform DFT on $x_u(m)$ at 740 to produce $X_u(k)$, which may be written as:

$$X_u(k) = x_u*(u^{-1}k)P_u(k),$$

and where k=0, . . . , M−1 and $u^{-1}$ is the modular multiplicative inverse of u. The phase constant term $P_u(k)$ may be a known constant term. or may be calculated as:

$$P_u(k) = \sum_{p=0}^{P-1} \exp\left(-\frac{j\pi(\mathrm{up}(p+1)M+2kpP)+u(u^{-1}k)(u^{-1}k+1)P}{PM}\right).$$

At 745, the transmitting device may perform IFFT on the ZC sequence associated with the phase constant to produce the OFDM symbol 750 having a total length N and ZH length Nh and ZT length Nt, and transmits the time-domain reference signal sequence to a receiving device. The receiving device may then recover $x_u*(u^{-1}k)$ in the frequency domain by performing FFT on the received time domain signal, and using it for channel estimation using a simple frequency-domain channel by taking a conjugate of the reference signal sequence and dividing the FFT of the received time domain symbol by the known phase constant $P_u(k)$.

In some aspects, the OFDM symbol generation techniques 700-a and 700-b may utilize the mathematical property that a DFT of a truncated ZC reference signal sequence may be written as a conjugate of a ZC sequence multiplied by a frequency dependent constant factor. This property may support simplified processing at the transmitting device and simplified decoding and processing at the receiving device as well.

OFDM symbol generation technique 700-c may support a method for receiving a time domain reference signal sequence generated via OFDM symbol generation techniques 700-a, 700-b, or both. The receiving device may receive a time domain OFDM symbol 765 of size N having a ZH 755 of length Nh and a ZT 760 of length Nt. The receiving device may perform FFT 770 on the OFDM symbol 765, then at 775 may divide the output of the FFT 770 and take the conjugate of the frequency domain sequence, then at 780 may perform frequency domain channel estimation on the received and processed sequence.

Figure 8:
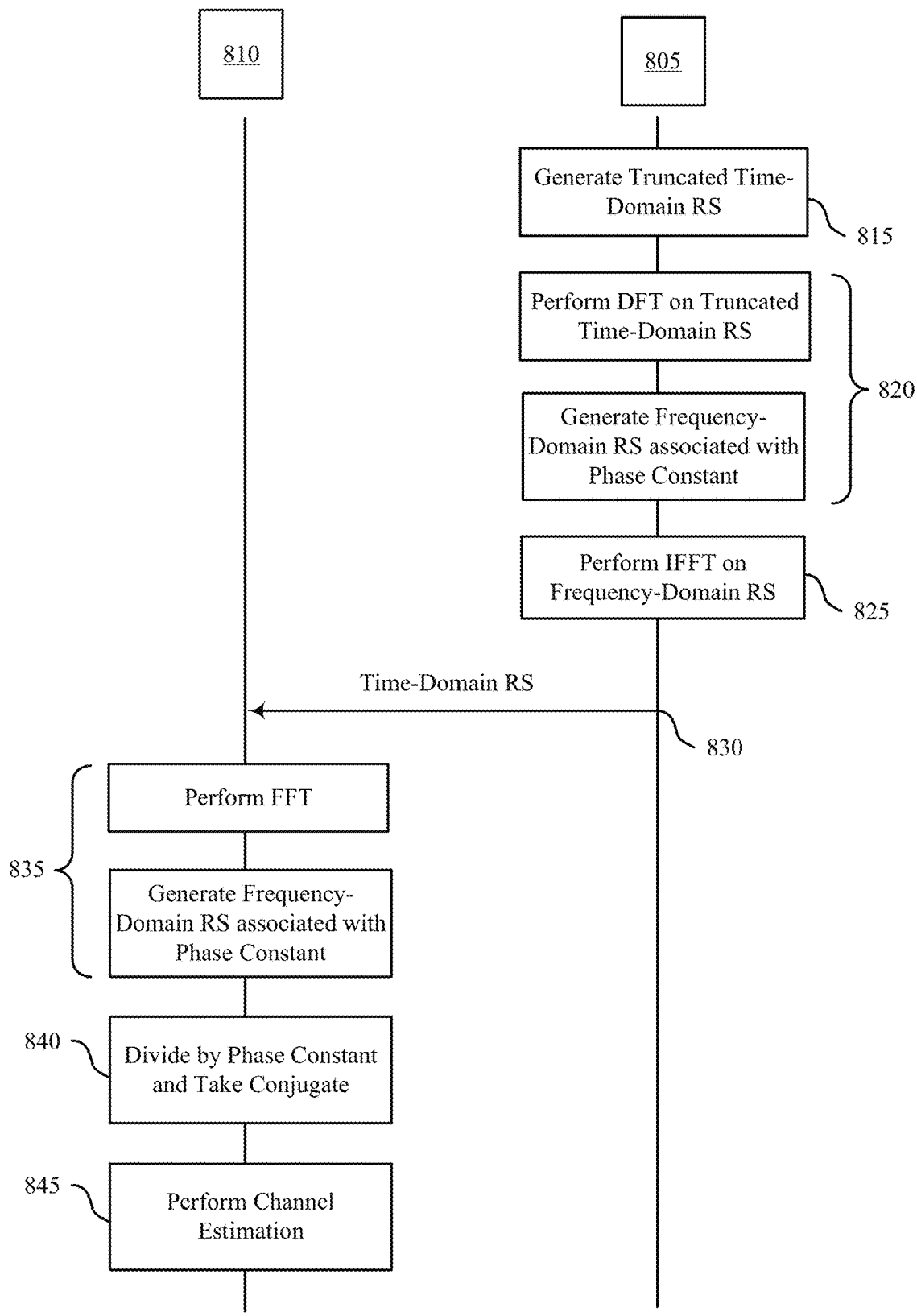
FIG. 8 illustrates an example of a process flow that supports reference signal design for ZT OFDM communications in accordance with one or more aspects of the present disclosure.

FIG. 8 illustrates an example of a process flow 800 that supports reference signal design for ZT OFDM communications in accordance with one or more aspects of the present disclosure. In some examples, process flow 800 may implement aspects of wireless communications system 100. The process flow 800 may include wireless devices 805 and 810 which may each be an example of a UE 115 or a network entity 105 as described herein. Alternative examples of the following process flow may be implemented, where some steps are performed in a different order than described or are not performed at all. In some cases, steps may include additional features not mentioned below, or further steps may be added.

At 815, a first wireless device 805 (e.g., a transmitting device 805) may generate a first time-domain reference signal sequence (e.g., corresponding to a DFT-S-OFDM waveform) using a DFT of a first size associated with the first time-domain reference signal sequence. In such cases, the first time-domain reference signal sequence has a first sequence length that is truncated to a second sequence length. For example, the first wireless device may generate the truncated time-domain reference signal by removing a set of bits from the head and the tail of the time-domain reference signal sequence.

After truncation of the first time-domain reference signal sequence, the first wireless device may add a zero-header portion and a zero-tail portion to the truncated time-domain reference signal sequence (or may set an existing header portion and an existing tail portion to be zeros). For example, the transmitting device 805 may add a first set of zeros corresponding to the header portion and a second set of zeros corresponding to the tail portion. In some cases, the first time-domain reference signal sequence may be a short-time domain reference signal sequence generated to have the second sequence length.

At 820, the transmitting device 805 may perform the DFT on the truncated first time-domain reference signal sequence to generate a frequency-domain reference signal sequence associated with a phase constant. In some examples, the first time-domain reference signal sequence and the truncated first time-domain reference signal sequence are associated with a set of ZC properties (e.g., the first time-domain reference signal sequence, the truncated first time-domain reference signal sequence, and the frequency-domain reference signal sequence comprise ZC reference signal sequences), and performing the DFT on the truncated first time-domain reference signal sequence leaves the set of ZC properties unchanged for the output of the DFT.

In some examples, the transmitting device 805 may generate the frequency-domain reference signal sequence via the DFT, and the frequency-domain reference signal sequence corresponds to a conjugate that is based on the truncated first time-domain reference signal sequence multiplied by the phase constant.

At 825, the transmitting device 805 may perform an IFFT on the frequency-domain reference signal sequence and the phase constant to generate a second time-domain reference signal sequence. In some cases, the transmitting device 805 may perform the IFFT on the frequency-domain reference signal sequence and the phase constant to reconstruct the first time-domain reference signal sequence. In such cases, the reconstructed first-time domain sequence is the second time-domain reference signal sequence that has a third length including the header portion and the tail portion.

At 830, the transmitting device 805 may transmit the second time-domain reference signal sequence to a second wireless device 810 (e.g., a receiving device 810). The receiving device 810 may receive the second time-domain reference signal sequence which includes the header portion and the tail portion. In such cases, the header portion and the tail portion include a first set zeros and a second set of zeros, respectively.

At 835, the receiving device 810 may perform an FFT on the time-domain reference signal sequence to generate a frequency-domain reference signal sequence associated with the phase constant. In some examples, the time-domain reference signal may be associated with a set of ZC properties, and the frequency-domain reference signal sequence is associated with the conjugate that is based on the time-domain reference signal sequence. In such cases, the time-domain reference signal sequence and the frequency-domain reference signal sequence are ZC reference signal sequences. In some examples, performing the FFT may include generating the frequency-domain reference signal sequence which corresponds to the conjugate based on a truncated first time-domain reference signal sequence multiplied by the phase constant.

At 840, the receiving device may process the frequency-domain reference signal sequence by dividing the frequency-domain reference signal sequence by the phase constant and taking a conjugate based on the frequency-domain reference signal sequence.

At 845, the receiving device 810 may perform a channel estimation procedure to estimate a channel associated with the frequency-domain reference signal sequence.

Figure 9:
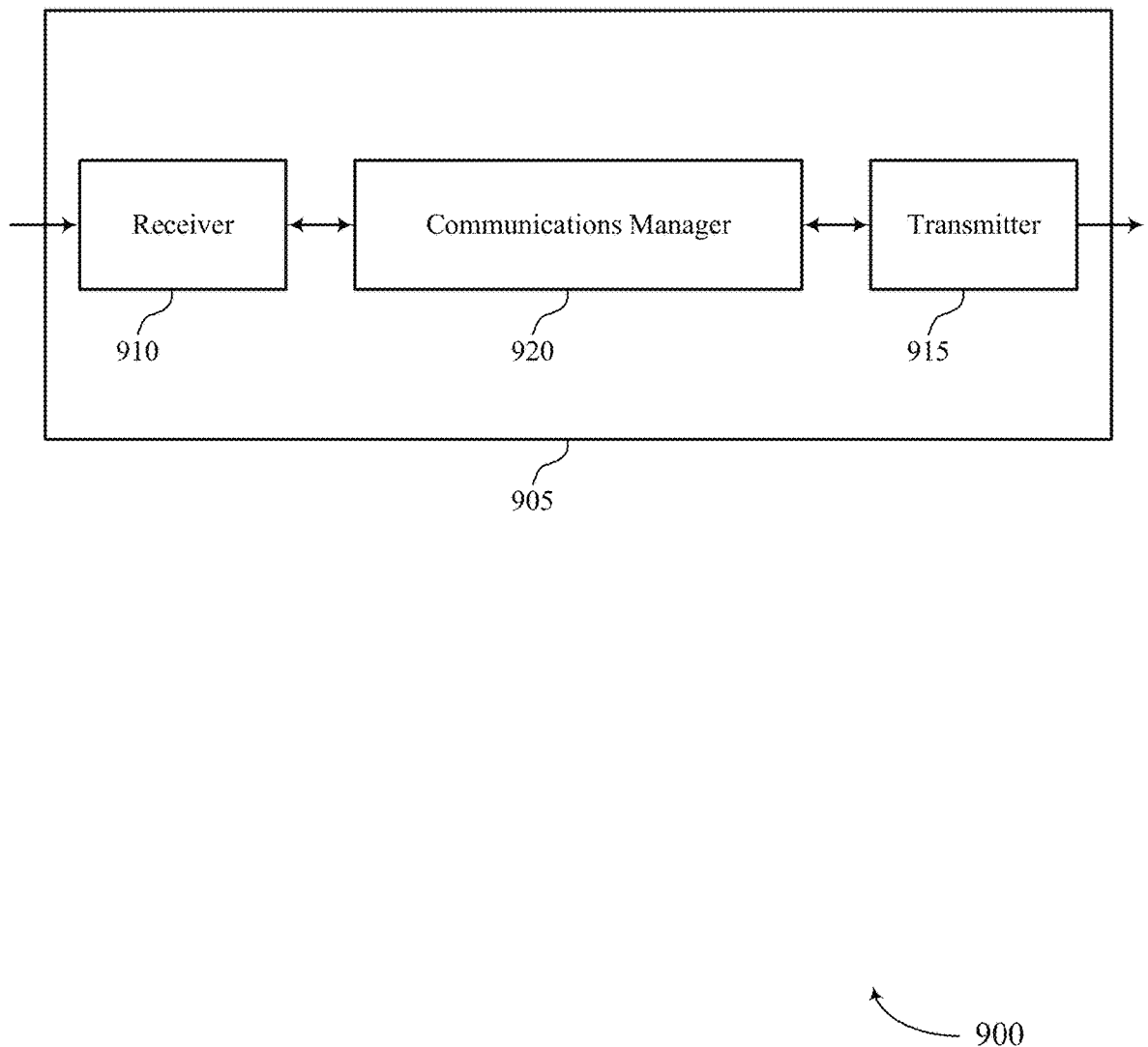
FIGS. 9 and 10 show block diagrams of devices that support reference signal design for ZT OFDM communications in accordance with one or more aspects of the present disclosure.

FIG. 9 shows a block diagram 900 of a device 905 that supports reference signal design for ZT OFDM communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of reference signal design for ZT OFDM communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a transmitting device in accordance with examples as disclosed herein. For example, the communications manager 920 may be configured as or otherwise support a means for generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence.

The communications manager 920 may be configured as or otherwise support a means for performing the DFT on the truncated first time-domain reference signal sequence to generate a frequency-domain reference signal sequence associated with a phase constant. The communications manager 920 may be configured as or otherwise support a means for performing an inverse fast-Fourier transform on the frequency-domain reference signal sequence associated with the phase constant to generate a second time-domain reference signal sequence. The communications manager 920 may be configured as or otherwise support a means for transmitting the second time-domain reference signal sequence.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing and reduced power consumption.

Figure 10:
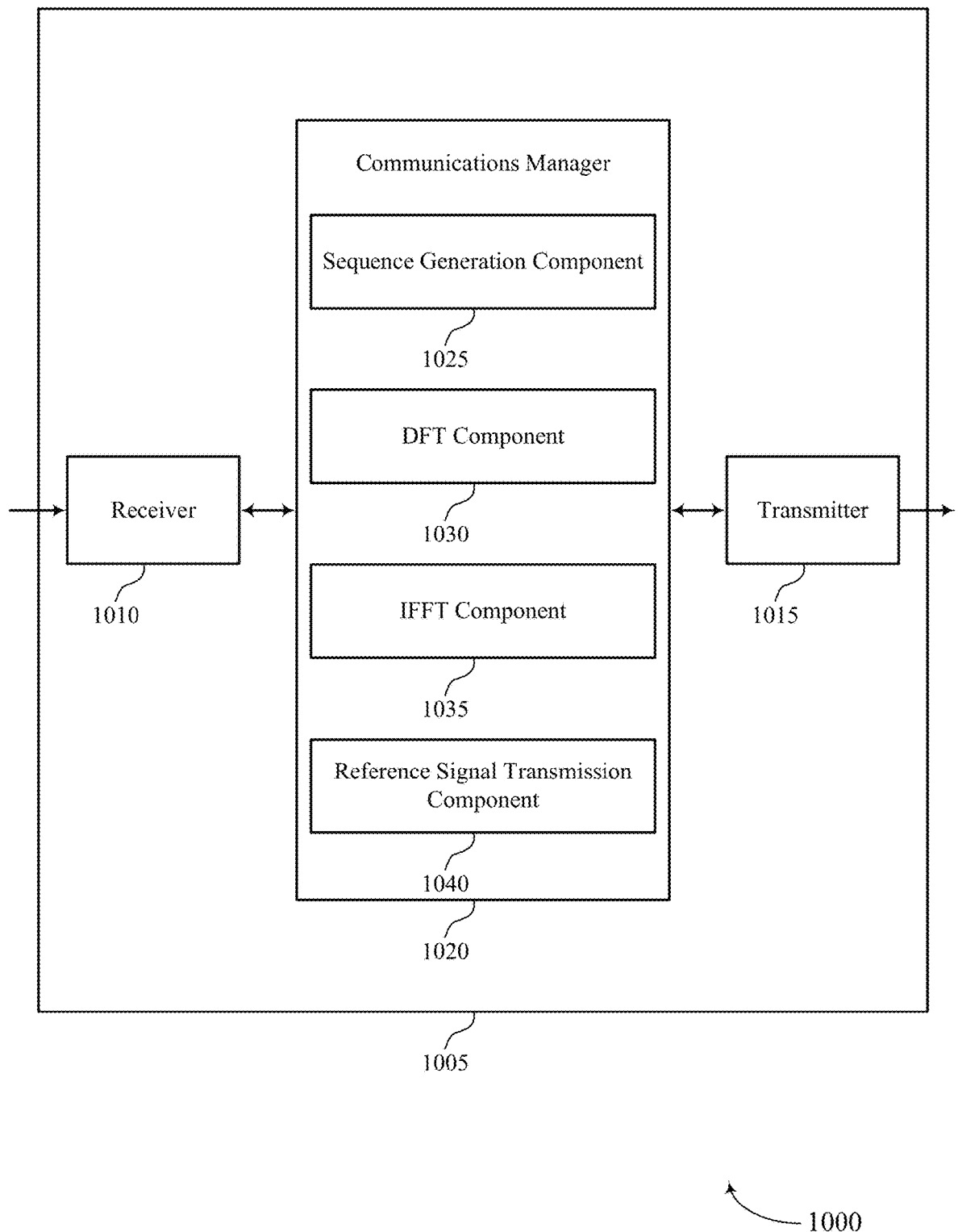

FIG. 10 shows a block diagram 1000 of a device 1005 that supports reference signal design for ZT OFDM communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of reference signal design for ZT OFDM communications as described herein. For example, the communications manager 1020 may include a sequence generation component 1025, a DFT component 1030, an IFFT component 1035, a reference signal transmission component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a transmitting device in accordance with examples as disclosed herein. The sequence generation component 1025 may be configured as or otherwise support a means for generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence. The DFT component 1030 may be configured as or otherwise support a means for performing the DFT on the truncated first time-domain reference signal sequence to generate a frequency-domain reference signal sequence associated with a phase constant. The IFFT component 1035 may be configured as or otherwise support a means for performing an inverse fast-Fourier transform on the frequency-domain reference signal sequence associated with the phase constant to generate a second time-domain reference signal sequence. The reference signal transmission component 1040 may be configured as or otherwise support a means for transmitting the second time-domain reference signal sequence.

Figure 11:
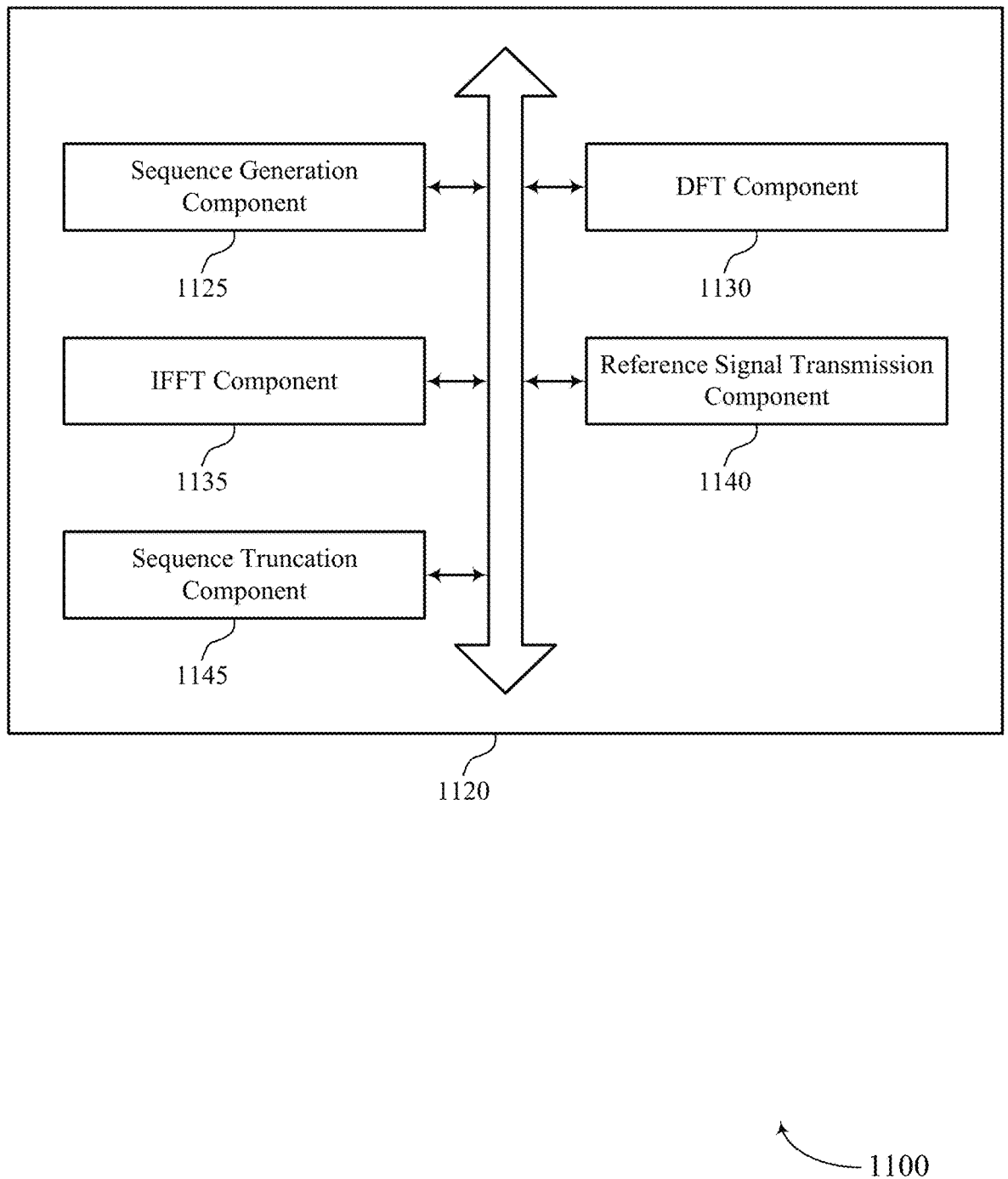
FIG. 11 shows a block diagram of a communications manager that supports reference signal design for ZT OFDM communications in accordance with one or more aspects of the present disclosure.

FIG. 11 shows a block diagram 1100 of a communications manager 1120 that supports reference signal design for ZT OFDM communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of reference signal design for ZT OFDM communications as described herein. For example, the communications manager 1120 may include a sequence generation component 1125, a DFT component 1130, an IFFT component 1135, a reference signal transmission component 1140, a sequence truncation component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a transmitting device in accordance with examples as disclosed herein. The sequence generation component 1125 may be configured as or otherwise support a means for generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence. The DFT component 1130 may be configured as or otherwise support a means for performing the DFT on the truncated first time-domain reference signal sequence to generate a frequency-domain reference signal sequence associated with a phase constant. The IFFT component 1135 may be configured as or otherwise support a means for performing an inverse fast-Fourier transform on the frequency-domain reference signal sequence associated with the phase constant to generate a second time-domain reference signal sequence. The reference signal transmission component 1140 may be configured as or otherwise support a means for transmitting the second time-domain reference signal sequence.

In some examples, to support addition of the header portion and the tail portion to the first time-domain reference signal sequence, the sequence truncation component 1145 may be configured as or otherwise support a means for truncating the first time-domain reference signal sequence using a first set of zeros corresponding to the header portion and a second set of multiple zeros corresponding to the tail portion.

In some examples, the first time-domain reference signal sequence and the truncated first time-domain reference signal sequence are associated with a set of ZC properties, and the DFT component 1130 may be configured as or otherwise support a means for performing the DFT on the truncated first time-domain reference signal sequence, where the set of ZC properties is unchanged between the truncated first time-domain reference signal sequence and an output of the DFT.

In some examples, to support performing the DFT on the truncated first time-domain reference signal sequence, the sequence generation component 1125 may be configured as or otherwise support a means for generating the frequency-domain reference signal sequence via the DFT, where the frequency-domain reference signal sequence corresponds to a conjugate based on the truncated first time-domain reference signal sequence multiplied by the phase constant.

In some examples, the IFFT component 1135 may be configured as or otherwise support a means for reconstructing the first time-domain reference signal sequence associated with the phase constant based on performing the IFFT.

In some examples, the reconstructed first time-domain reference signal sequence includes the second time-domain reference signal sequence and has a third sequence length that includes the header portion and the tail portion.

In some examples, the truncated first time-domain reference signal sequence includes a short time-domain reference signal sequence generated to have the second sequence length, and the DFT component 1130 may be configured as or otherwise support a means for performing the DFT on the short time-domain reference signal sequence to generate the frequency-domain reference signal sequence associated with the phase constant.

In some examples, to support performing the DFT on the short time-domain reference signal sequence, the sequence generation component 1125 may be configured as or otherwise support a means for generating the frequency-domain reference signal sequence, where the frequency-domain reference signal sequence corresponds to a conjugate based on the short time-domain reference signal sequence multiplied by the phase constant.

In some examples, the first time-domain reference signal sequence corresponds to a DFT-spread-orthogonal frequency division multiplexed waveform.

In some examples, the first time-domain reference signal sequence includes a root sequence associated with the first sequence length.

In some examples, the first time-domain reference signal sequence, the truncated first time-domain reference signal sequence, and the frequency-domain reference signal sequence include ZC reference signal sequences.

Figure 12:
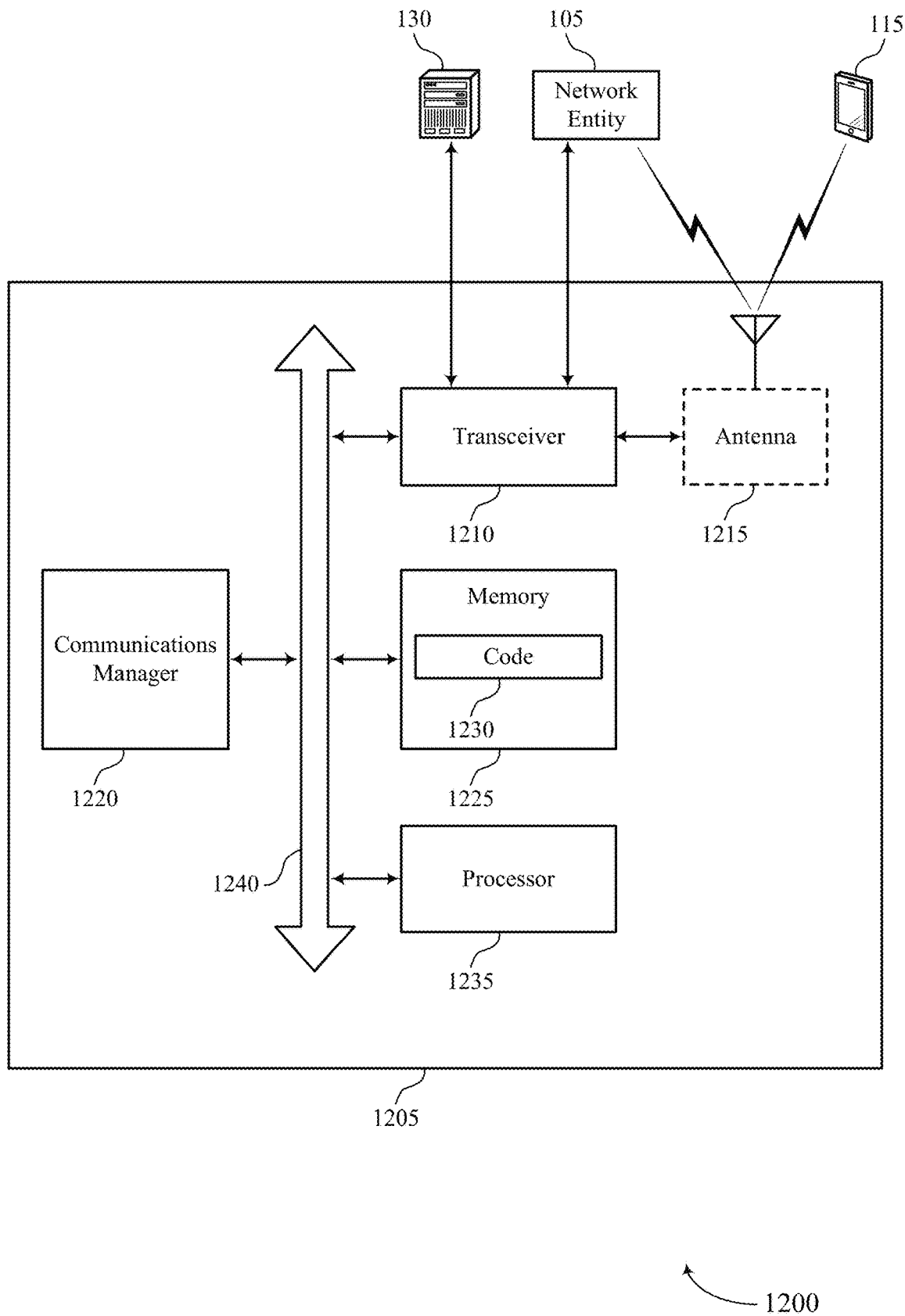
FIG. 12 shows a diagram of a system including a device that supports reference signal design for ZT OFDM communications in accordance with one or more aspects of the present disclosure.

FIG. 12 shows a diagram of a system 1200 including a device 1205 that supports reference signal design for ZT OFDM communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting reference signal design for ZT OFDM communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or a series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a transmitting device in accordance with examples as disclosed herein. For example, the communications manager 1220 may be configured as or otherwise support a means for generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence. The communications manager 1220 may be configured as or otherwise support a means for performing the DFT on the truncated first time-domain reference signal sequence to generate a frequency-domain reference signal sequence associated with a phase constant. The communications manager 1220 may be configured as or otherwise support a means for performing an inverse fast-Fourier transform on the frequency-domain reference signal sequence associated with the phase constant to generate a second time-domain reference signal sequence. The communications manager 1220 may be configured as or otherwise support a means for transmitting the second time-domain reference signal sequence.

By including or configuring the communications manager 1220 in accordance with examples as described herein, the device 1205 may support techniques for improved communication reliability, reduced latency, improved user experience related to reduced processing, reduced power consumption, longer battery life, improved utilization of processing capability, and increased channel estimation efficiency.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of reference signal design for ZT OFDM communications as described herein, or the processor 1235 and the memory 1225 may be otherwise configured to perform or support such operations.

Figure 13:
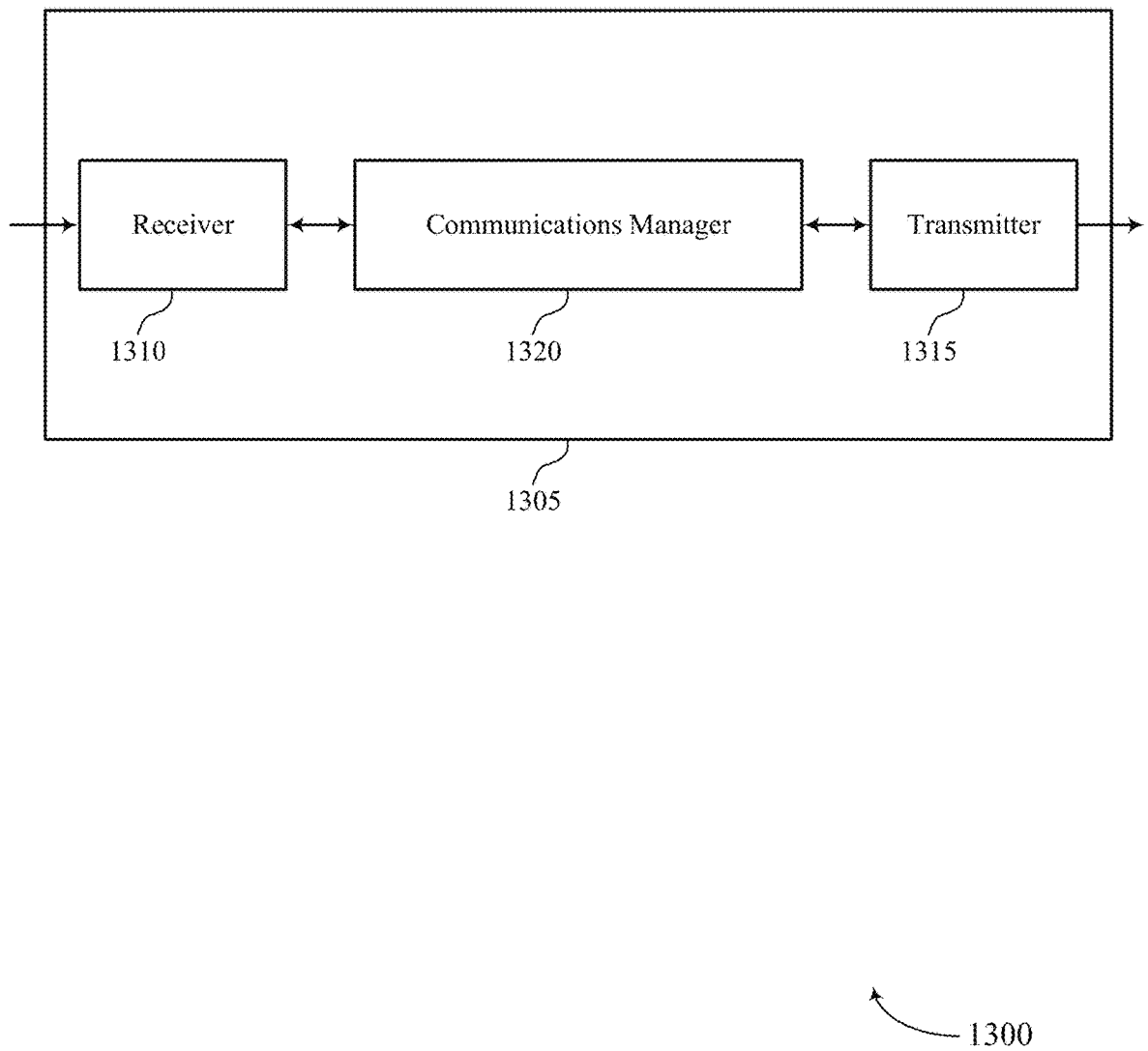
FIGS. 13 and 14 show block diagrams of devices that support reference signal design for ZT OFDM communications in accordance with one or more aspects of the present disclosure.

FIG. 13 shows a block diagram 1300 of a device 1305 that supports reference signal design for ZT OFDM communications in accordance with one or more aspects of the present disclosure. The device 1305 may be an example of aspects of a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to reference signal design for ZT OFDM communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to reference signal design for ZT OFDM communications). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of reference signal design for ZT OFDM communications as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a receiving device in accordance with examples as disclosed herein. For example, the communications manager 1320 may be configured as or otherwise support a means for receiving, from a transmitting device, a time-domain reference signal sequence including a first sequence that includes a header portion and a tail portion. The communications manager 1320 may be configured as or otherwise support a means for performing a fast Fourier transform on the time-domain reference signal sequence to generate a frequency-domain reference signal sequence associated with a phase constant. The communications manager 1320 may be configured as or otherwise support a means for processing the frequency-domain reference signal sequence by dividing the frequency-domain reference signal sequence by the phase constant and taking a conjugate based on the frequency-domain reference signal sequence. The communications manager 1320 may be configured as or otherwise support a means for performing a channel estimation procedure to estimate a channel associated with the frequency-domain reference signal sequence.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing and reduced power consumption.

Figure 14:
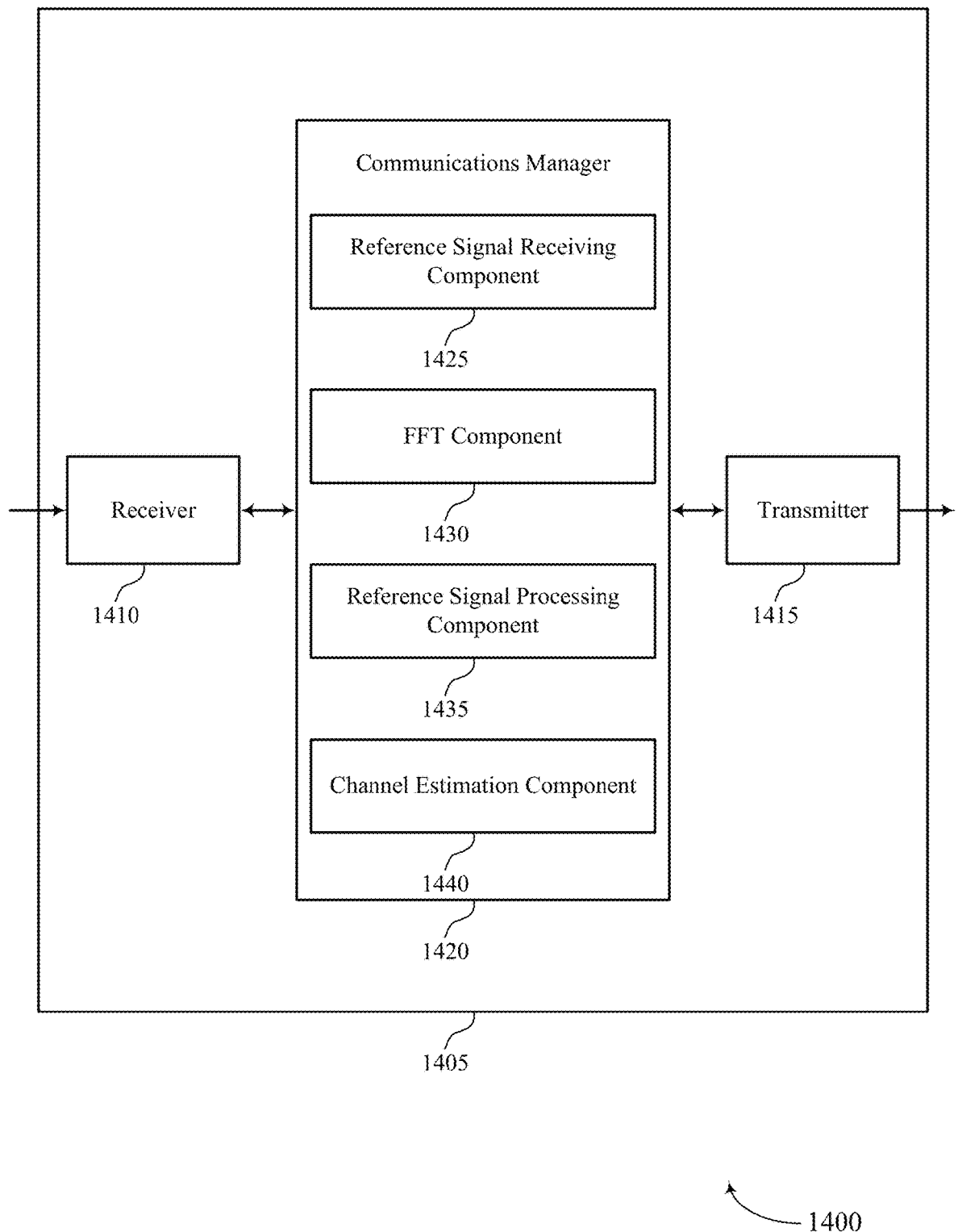

FIG. 14 shows a block diagram 1400 of a device 1405 that supports reference signal design for ZT OFDM communications in accordance with one or more aspects of the present disclosure. The device 1405 may be an example of aspects of a device 1305 or a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to reference signal design for ZT OFDM communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to reference signal design for ZT OFDM communications). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of reference signal design for ZT OFDM communications as described herein. For example, the communications manager 1420 may include a reference signal receiving component 1425, an FFT component 1430, a reference signal processing component 1435, a channel estimation component 1440, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a receiving device in accordance with examples as disclosed herein. The reference signal receiving component 1425 may be configured as or otherwise support a means for receiving, from a transmitting device, a time-domain reference signal sequence including a first sequence that includes a header portion and a tail portion. The FFT component 1430 may be configured as or otherwise support a means for performing a fast Fourier transform on the time-domain reference signal sequence to generate a frequency-domain reference signal sequence associated with a phase constant. The reference signal processing component 1435 may be configured as or otherwise support a means for processing the frequency-domain reference signal sequence by dividing the frequency-domain reference signal sequence by the phase constant and taking a conjugate based on the frequency-domain reference signal sequence. The channel estimation component 1440 may be configured as or otherwise support a means for performing a channel estimation procedure to estimate a channel associated with the frequency-domain reference signal sequence.

Figure 15:
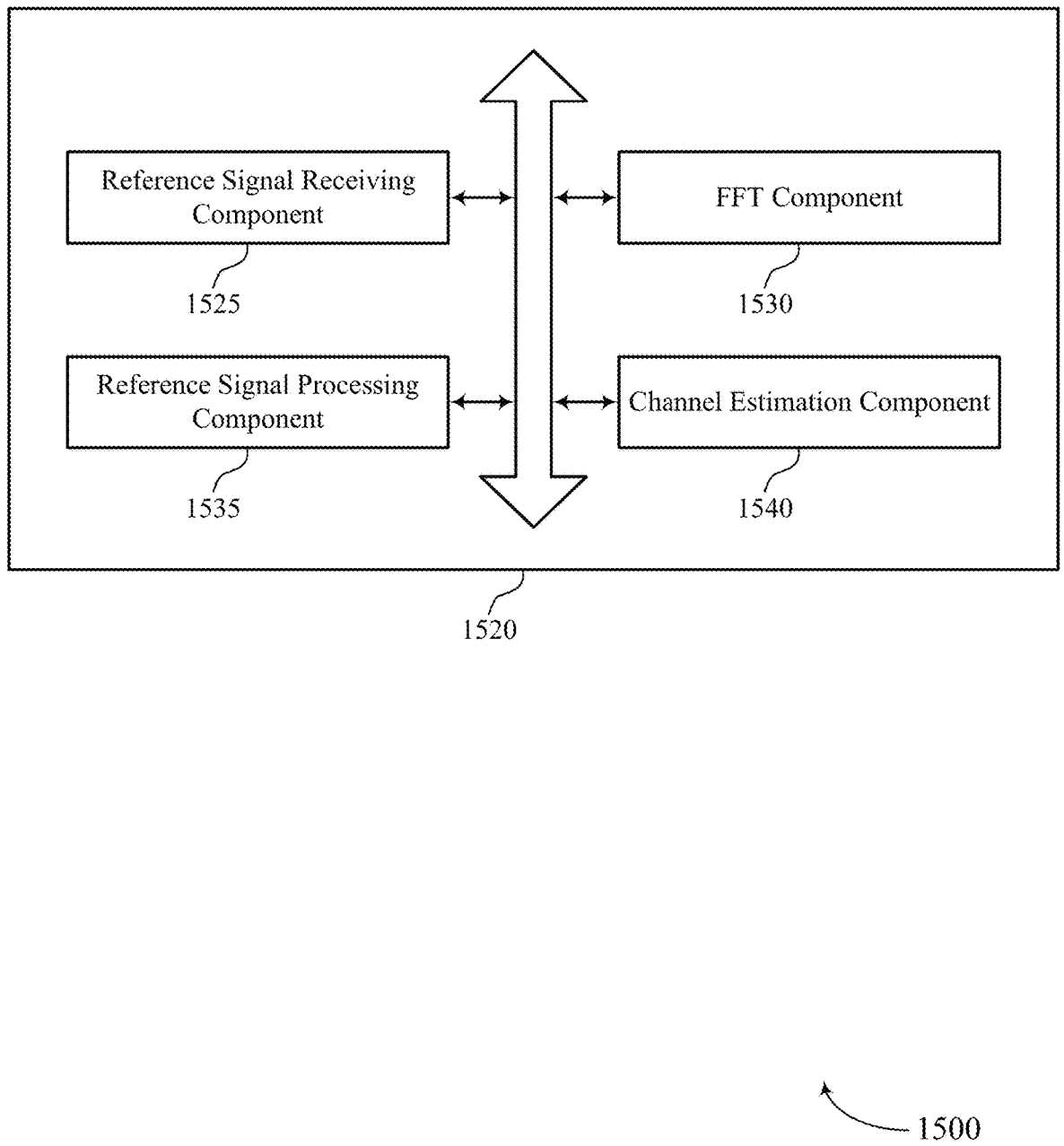
FIG. 15 shows a block diagram of a communications manager that supports reference signal design for ZT OFDM communications in accordance with one or more aspects of the present disclosure.

FIG. 15 shows a block diagram 1500 of a communications manager 1520 that supports reference signal design for ZT OFDM communications in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of reference signal design for ZT OFDM communications as described herein. For example, the communications manager 1520 may include a reference signal receiving component 1525, an FFT component 1530, a reference signal processing component 1535, a channel estimation component 1540, or any combination thereof. Each of these components may communicate, directly or indirectly, with one another (e.g., via one or more buses).

The communications manager 1520 may support wireless communications at a receiving device in accordance with examples as disclosed herein. The reference signal receiving component 1525 may be configured as or otherwise support a means for receiving, from a transmitting device, a time-domain reference signal sequence including a first sequence that includes a header portion and a tail portion. The FFT component 1530 may be configured as or otherwise support a means for performing a fast Fourier transform on the time-domain reference signal sequence to generate a frequency-domain reference signal sequence associated with a phase constant. The reference signal processing component 1535 may be configured as or otherwise support a means for processing the frequency-domain reference signal sequence by dividing the frequency-domain reference signal sequence by the phase constant and taking a conjugate based on the frequency-domain reference signal sequence. The channel estimation component 1540 may be configured as or otherwise support a means for performing a channel estimation procedure to estimate a channel associated with the frequency-domain reference signal sequence.

In some examples, the header portion and the tail portion further include a first set of multiple zeros corresponding to the header portion and a second set of multiple zeros corresponding to the tail portion.

In some examples, the FFT component 1530 may be configured as or otherwise support a means for performing the fast Fourier transform on the time-domain reference signal sequence having a set of ZC properties, where the frequency-domain reference signal sequence is associated with the conjugate that is based on the time-domain reference signal sequence based on the set of ZC properties.

In some examples, to support performing the fast Fourier transform on the time-domain reference signal sequence, the FFT component 1530 may be configured as or otherwise support a means for generating the frequency-domain reference signal sequence via the fast Fourier transform, where the frequency-domain reference signal sequence corresponds to the conjugate based on a truncated first time-domain reference signal sequence multiplied by the phase constant.

In some examples, the time-domain reference signal sequence corresponds to a DFT-spread-orthogonal frequency division multiplexed waveform.

In some examples, the time-domain reference signal sequence and the frequency-domain reference signal sequence include ZC reference signal sequences.

Figure 16:
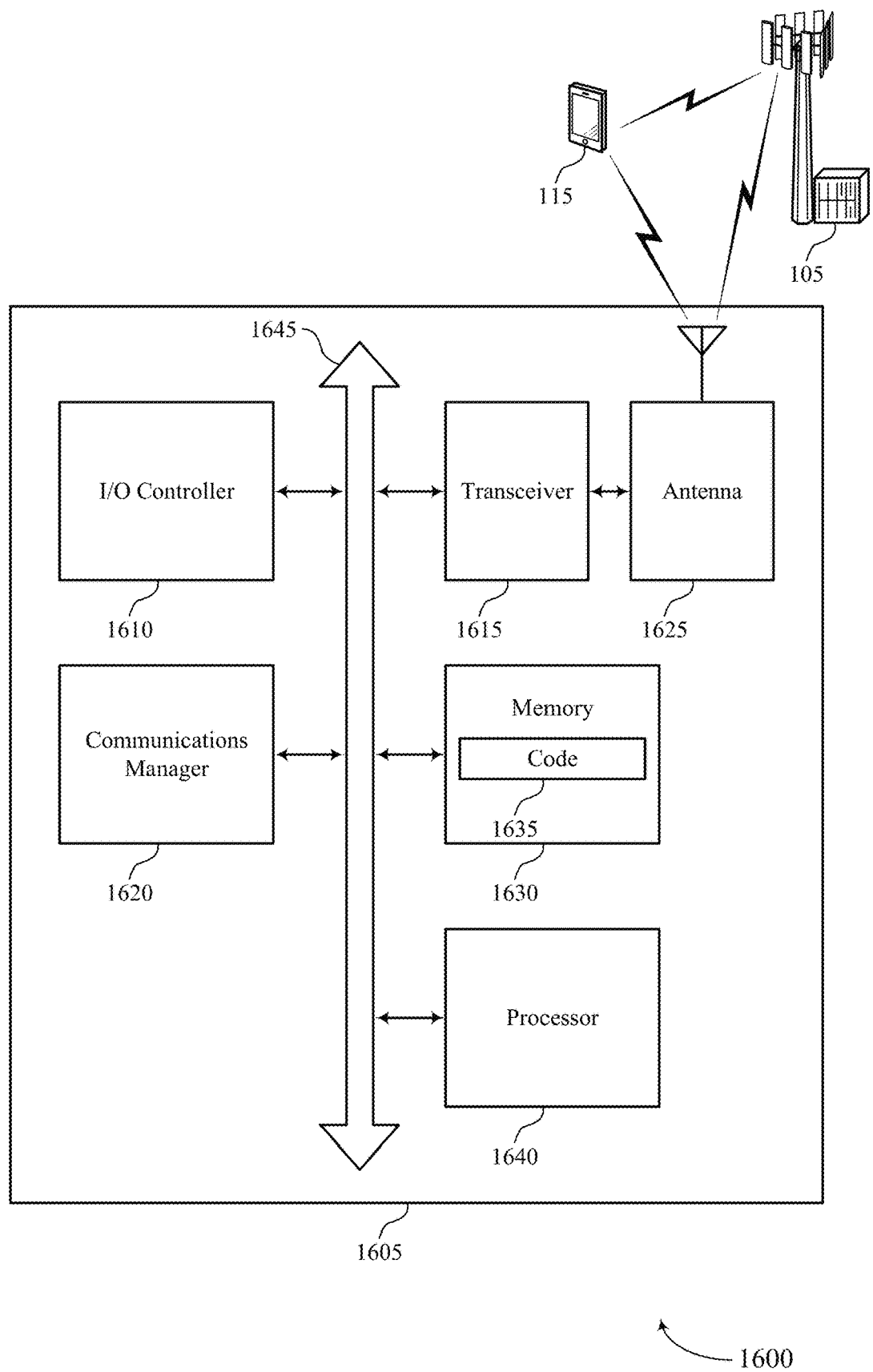
FIG. 16 shows a diagram of a system including a device that supports reference signal design for ZT OFDM communications in accordance with one or more aspects of the present disclosure.

FIG. 16 shows a diagram of a system 1600 including a device 1605 that supports reference signal design for ZT OFDM communications in accordance with one or more aspects of the present disclosure. The device 1605 may be an example of or include the components of a device 1305, a device 1405, or a UE 115 as described herein. The device 1605 may communicate (e.g., wirelessly) with one or more network entities 105, one or more UEs 115, or any combination thereof. The device 1605 may include components for bi-directional voice and data communications including components for transmitting and receiving communications, such as a communications manager 1620, an input/output (I/O) controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally or alternatively, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include random access memory (RAM) and read-only memory (ROM). The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a basic I/O system (BIOS) which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting reference signal design for ZT OFDM communications). For example, the device 1605 or a component of the device 1605 may include a processor 1640 and memory 1630 coupled with or to the processor 1640, the processor 1640 and memory 1630 configured to perform various functions described herein.

The communications manager 1620 may support wireless communications at a receiving device in accordance with examples as disclosed herein. For example, the communications manager 1620 may be configured as or otherwise support a means for receiving, from a transmitting device, a time-domain reference signal sequence including a first sequence that includes a header portion and a tail portion. The communications manager 1620 may be configured as or otherwise support a means for performing a fast Fourier transform on the time-domain reference signal sequence to generate a frequency-domain reference signal sequence associated with a phase constant. The communications manager 1620 may be configured as or otherwise support a means for processing the frequency-domain reference signal sequence by dividing the frequency-domain reference signal sequence by the phase constant and taking a conjugate based on the frequency-domain reference signal sequence. The communications manager 1620 may be configured as or otherwise support a means for performing a channel estimation procedure to estimate a channel associated with the frequency-domain reference signal sequence.

By including or configuring the communications manager 1620 in accordance with examples as described herein, the device 1605 may support techniques for improved communication reliability, reduced latency, improved user experience related to reduced processing, reduced power consumption, longer battery life, improved utilization of processing capability, and increased channel estimation efficiency.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of reference signal design for ZT OFDM communications as described herein, or the processor 1640 and the memory 1630 may be otherwise configured to perform or support such operations.

Figure 17:
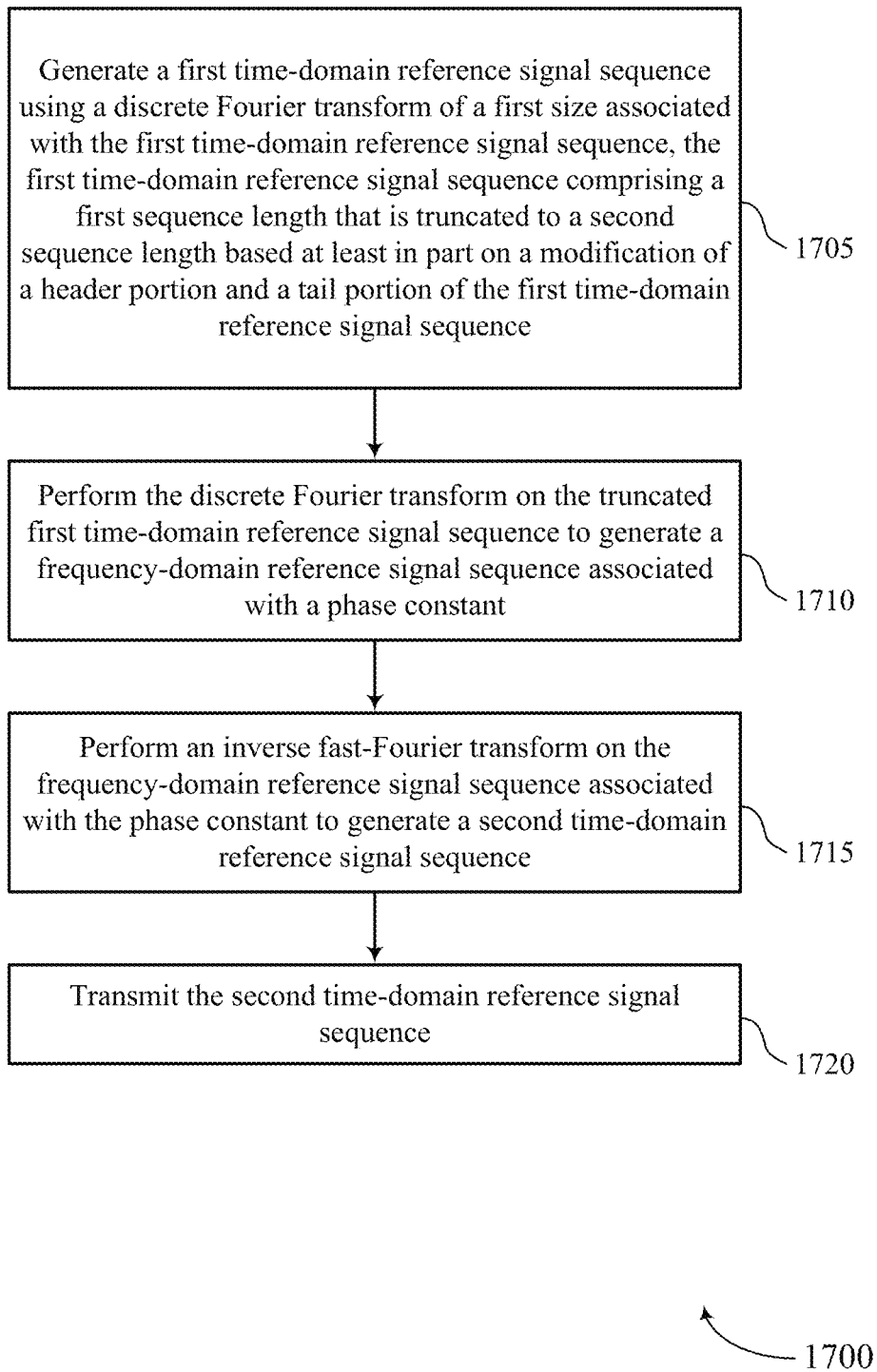
FIGS. 17 through 21 show flowcharts illustrating methods that support reference signal design for ZT OFDM communications in accordance with one or more aspects of the present disclosure.

FIG. 17 shows a flowchart illustrating a method 1700 that supports reference signal design for ZT OFDM communications in accordance with one or more aspects of the present disclosure. The operations of the method 1700 may be implemented by a network entity or its components as described herein. For example, the operations of the method 1700 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1705, the method may include generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence. The operations of 1705 may be performed in accordance with examples as disclosed herein. In some examples, aspects of the operations of 1705 may be performed by a sequence generation component 1125 as described with reference to FIG. 11.

At 1710, the method may include performing the DFT on the truncated first time-domain reference signal sequence to generate a frequency-domain reference signal sequence associated with a phase constant. The operations of 1710 may be performed in accordance with examples as disclosed herein. In some examples, aspects of the operations of 1710 may be performed by a DFT component 1130 as described with reference to FIG. 11.

At 1715, the method may include performing an inverse fast-Fourier transform on the frequency-domain reference signal sequence associated with the phase constant to generate a second time-domain reference signal sequence. The operations of 1715 may be performed in accordance with examples as disclosed herein. In some examples, aspects of the operations of 1715 may be performed by an IFFT component 1135 as described with reference to FIG. 11.

At 1720, the method may include transmitting the second time-domain reference signal sequence. The operations of 1720 may be performed in accordance with examples as disclosed herein. In some examples, aspects of the operations of 1720 may be performed by a reference signal transmission component 1140 as described with reference to FIG. 11.

Figure 18:
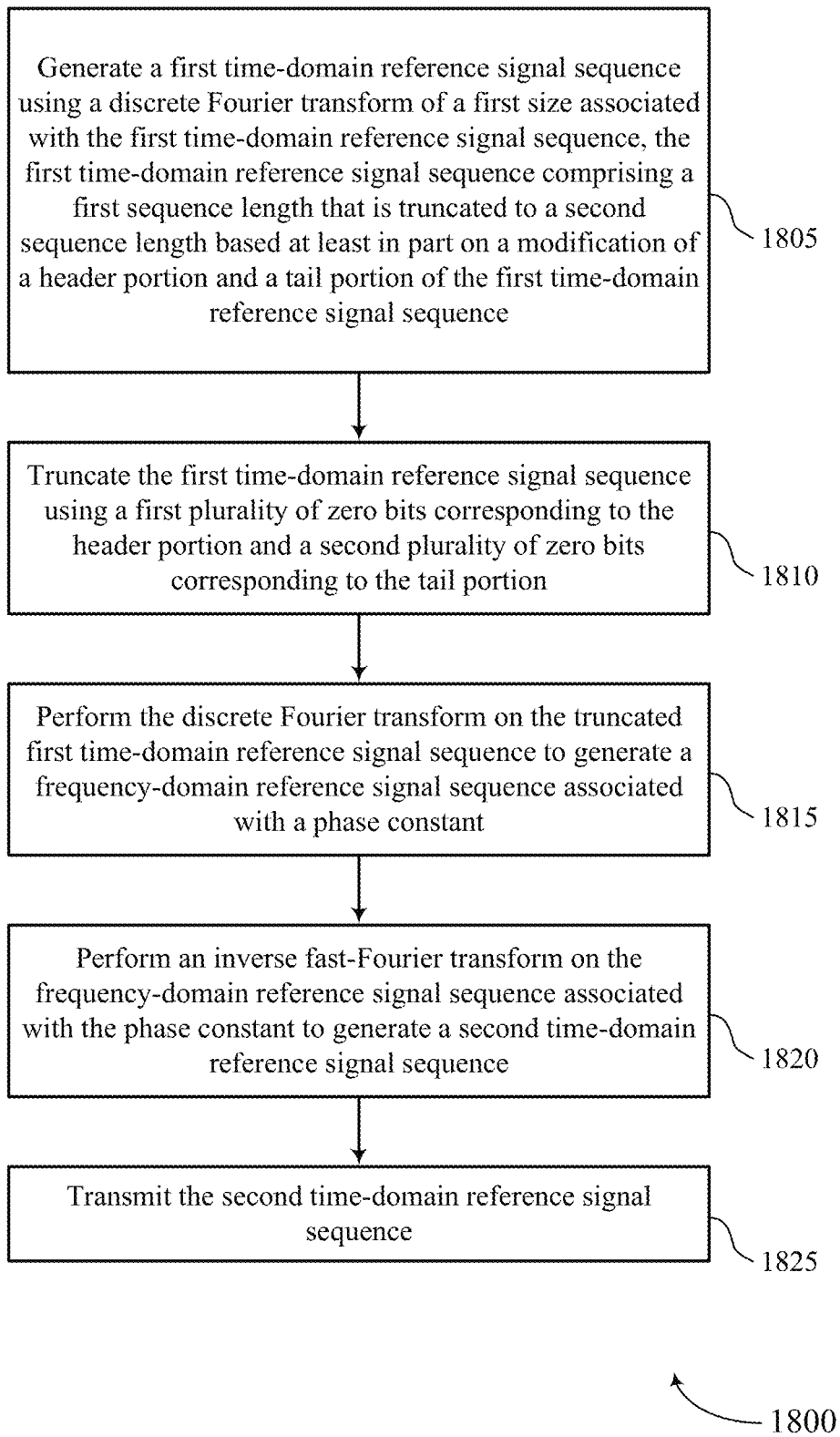

FIG. 18 shows a flowchart illustrating a method 1800 that supports reference signal design for ZT OFDM communications in accordance with one or more aspects of the present disclosure. The operations of the method 1800 may be implemented by a network entity or its components as described herein. For example, the operations of the method 1800 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1805, the method may include generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence. The operations of 1805 may be performed in accordance with examples as disclosed herein. In some examples, aspects of the operations of 1805 may be performed by a sequence generation component 1125 as described with reference to FIG. 11.

At 1810, the method may include truncating the first time-domain reference signal sequence using a first set of multiple zeros corresponding to the header portion and a second set of multiple zeros corresponding to the tail portion. The operations of 1810 may be performed in accordance with examples as disclosed herein. In some examples, aspects of the operations of 1810 may be performed by a sequence truncation component 1145 as described with reference to FIG. 11.

At 1815, the method may include performing the DFT on the truncated first time-domain reference signal sequence to generate a frequency-domain reference signal sequence associated with a phase constant. The operations of 1815 may be performed in accordance with examples as disclosed herein. In some examples, aspects of the operations of 1815 may be performed by a DFT component 1130 as described with reference to FIG. 11.

At 1820, the method may include performing an inverse fast-Fourier transform on the frequency-domain reference signal sequence associated with the phase constant to generate a second time-domain reference signal sequence. The operations of 1820 may be performed in accordance with examples as disclosed herein. In some examples, aspects of the operations of 1820 may be performed by an IFFT component 1135 as described with reference to FIG. 11.

At 1825, the method may include transmitting the second time-domain reference signal sequence. The operations of 1825 may be performed in accordance with examples as disclosed herein. In some examples, aspects of the operations of 1825 may be performed by a reference signal transmission component 1140 as described with reference to FIG. 11.

Figure 19:
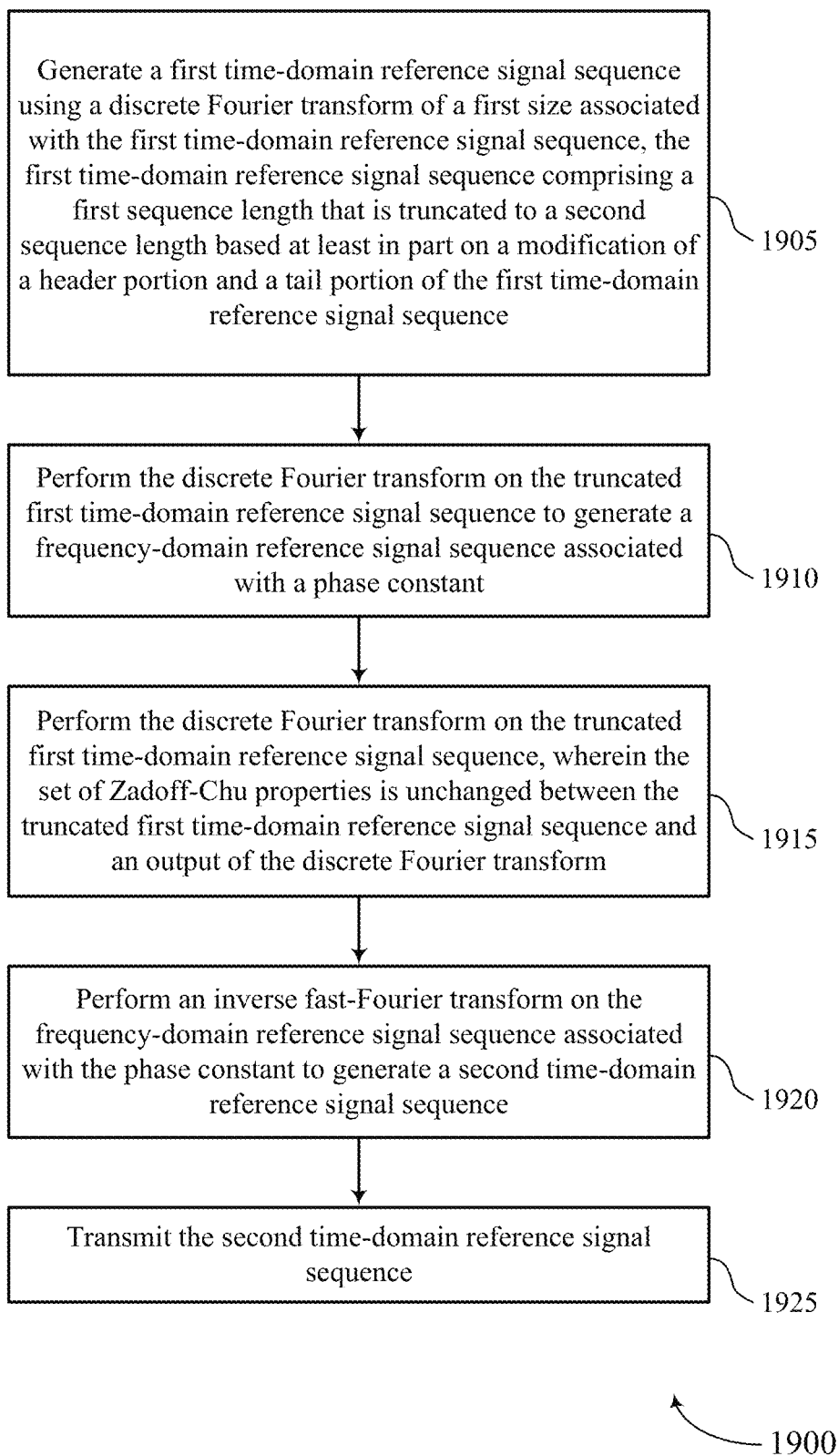

FIG. 19 shows a flowchart illustrating a method 1900 that supports reference signal design for ZT OFDM communications in accordance with one or more aspects of the present disclosure. The operations of the method 1900 may be implemented by a network entity or its components as described herein. For example, the operations of the method 1900 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1905, the method may include generating a first time-domain reference signal sequence using a DFT of a first size associated with the first time-domain reference signal sequence, the first time-domain reference signal sequence including a first sequence length that is truncated to a second sequence length based on a modification of a header portion and a tail portion to the first time-domain reference signal sequence. The operations of 1905 may be performed in accordance with examples as disclosed herein. In some examples, aspects of the operations of 1905 may be performed by a sequence generation component 1125 as described with reference to FIG. 11.

At 1910, the method may include performing the DFT on the truncated first time-domain reference signal sequence to generate a frequency-domain reference signal sequence associated with a phase constant. The operations of 1910 may be performed in accordance with examples as disclosed herein. In some examples, aspects of the operations of 1910 may be performed by a DFT component 1130 as described with reference to FIG. 11.

At 1915, the method may include performing the DFT on the truncated first time-domain reference signal sequence, where the set of ZC properties is unchanged between the truncated first time-domain reference signal sequence and an output of the DFT. The operations of 1915 may be performed in accordance with examples as disclosed herein. In some examples, aspects of the operations of 1915 may be performed by a DFT component 1130 as described with reference to FIG. 11.

At 1920, the method may include performing an inverse fast-Fourier transform on the frequency-domain reference signal sequence associated with the phase constant to generate a second time-domain reference signal sequence. The operations of 1920 may be performed in accordance with examples as disclosed herein. In some examples, aspects of the operations of 1920 may be performed by an IFFT component 1135 as described with reference to FIG. 11.

At 1925, the method may include transmitting the second time-domain reference signal sequence. The operations of 1925 may be performed in accordance with examples as disclosed herein. In some examples, aspects of the operations of 1925 may be performed by a reference signal transmission component 1140 as described with reference to FIG. 11.

Figure 20:
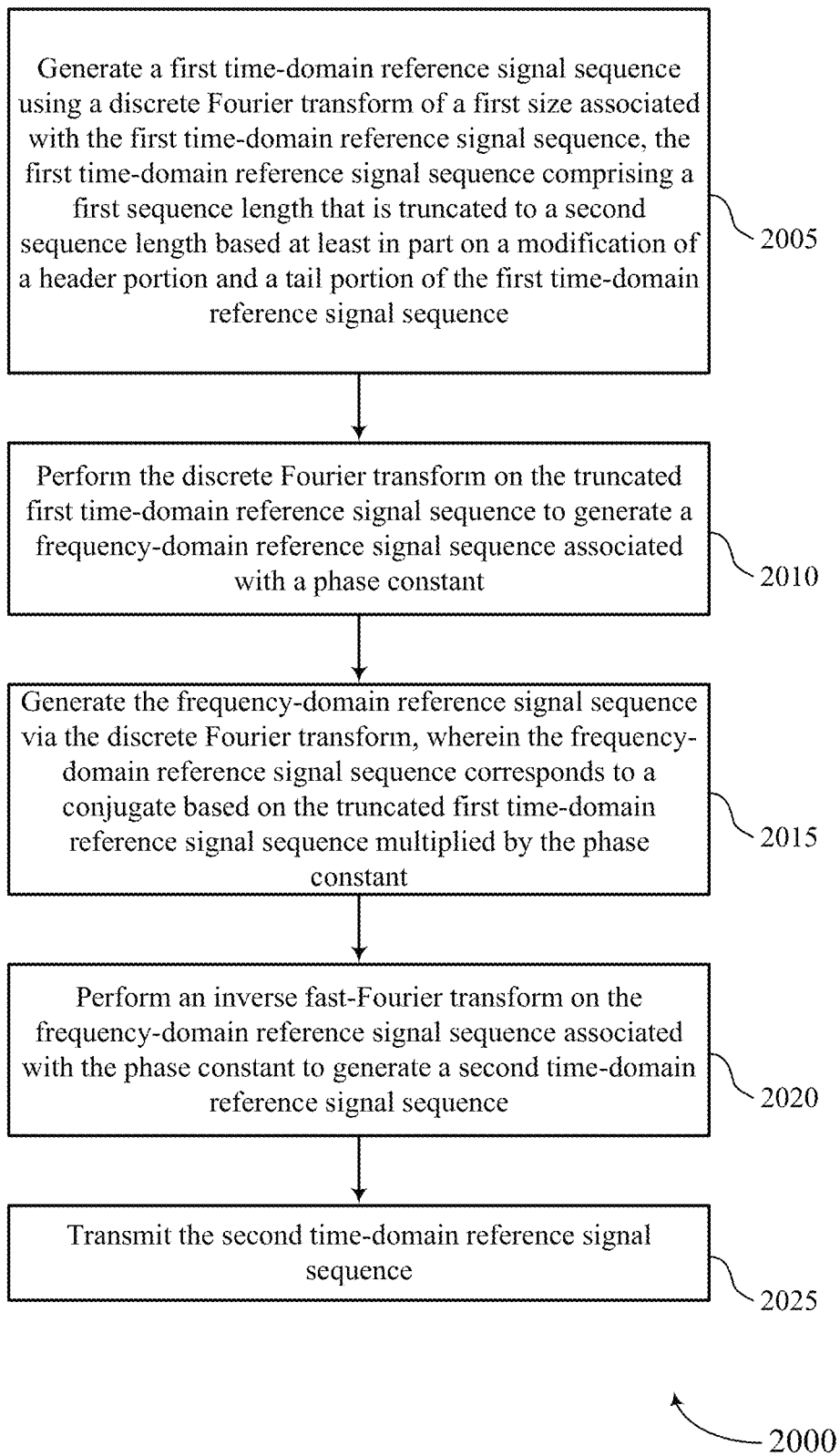

FIG. 20 shows a flowchart illustrating a method 2000 that supports reference signal design for ZT OFDM communications in accordance with one or more aspects of the present disclosure. The operations of the method 2000 may be implemented by a network entity or its components as described herein. For example, the operations of the method 2000 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 2005, the method may include generating a first time-domain reference signal sequence using a DFT of a first size associated with the first time-domain reference signal sequence, the first time-domain reference signal sequence including a first sequence length that is truncated to a second sequence length based on a modification of a header portion and a tail portion of the first time-domain reference signal sequence. The operations of 2005 may be performed in accordance with examples as disclosed herein. In some examples, aspects of the operations of 2005 may be performed by a sequence generation component 1125 as described with reference to FIG. 11.

At 2010, the method may include performing the DFT on the truncated first time-domain reference signal sequence to generate a frequency-domain reference signal sequence associated with a phase constant. The operations of 2010 may be performed in accordance with examples as disclosed herein. In some examples, aspects of the operations of 2010 may be performed by a DFT component 1130 as described with reference to FIG. 11.

At 2015, the method may include generating the frequency-domain reference signal sequence via the DFT, where the frequency-domain reference signal sequence corresponds to a conjugate based on the truncated first time-domain reference signal sequence multiplied by the phase constant. The operations of 2015 may be performed in accordance with examples as disclosed herein. In some examples, aspects of the operations of 2015 may be performed by a sequence generation component 1125 as described with reference to FIG. 11.

At 2020, the method may include performing an inverse fast-Fourier transform on the frequency-domain reference signal sequence associated with the phase constant to generate a second time-domain reference signal sequence. The operations of 2020 may be performed in accordance with examples as disclosed herein. In some examples, aspects of the operations of 2020 may be performed by an IFFT component 1135 as described with reference to FIG. 11.

At 2025, the method may include transmitting the second time-domain reference signal sequence. The operations of 2025 may be performed in accordance with examples as disclosed herein. In some examples, aspects of the operations of 2025 may be performed by a reference signal transmission component 1140 as described with reference to FIG. 11.

Figure 21:
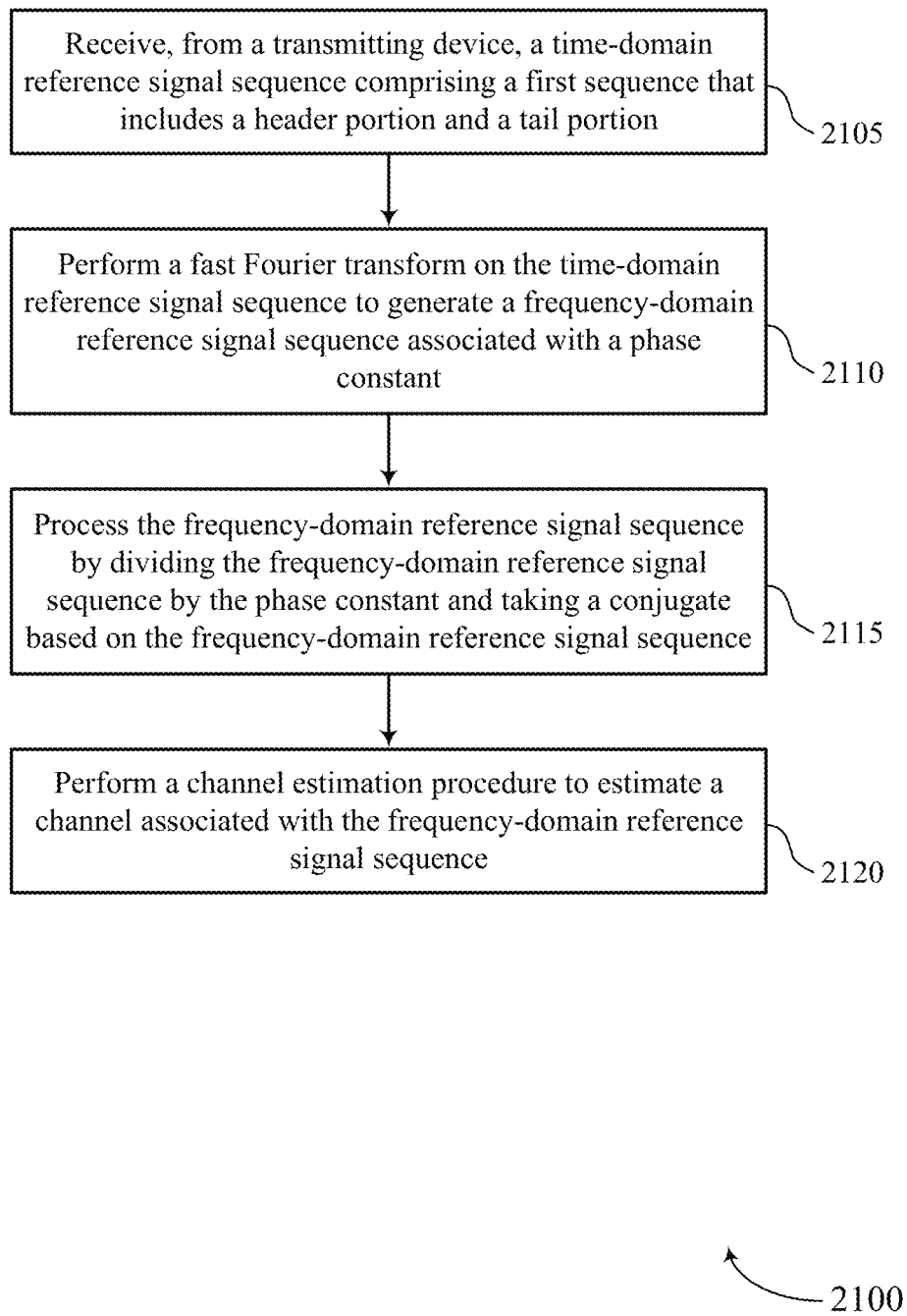

FIG. 21 shows a flowchart illustrating a method 2100 that supports reference signal design for ZT OFDM communications in accordance with one or more aspects of the present disclosure. The operations of the method 2100 may be implemented by a UE or its components as described herein. For example, the operations of the method 2100 may be performed by a UE 115 as described with reference to FIGS. 1 through 8 and 13 through 16. In some examples, a UE may execute a set of instructions to control the functional elements of the UE to perform the described functions. Additionally, or alternatively, the UE may perform aspects of the described functions using special-purpose hardware.

At 2105, the method may include receiving, from a transmitting device, a time-domain reference signal sequence including a first sequence that includes a header portion and a tail portion. The operations of 2105 may be performed in accordance with examples as disclosed herein. In some examples, aspects of the operations of 2105 may be performed by a reference signal receiving component 1525 as described with reference to FIG. 15.

At 2110, the method may include performing a fast Fourier transform on the time-domain reference signal sequence to generate a frequency-domain reference signal sequence associated with a phase constant. The operations of 2110 may be performed in accordance with examples as disclosed herein. In some examples, aspects of the operations of 2110 may be performed by an FFT component 1530 as described with reference to FIG. 15.

At 2115, the method may include processing the frequency-domain reference signal sequence by dividing the frequency-domain reference signal sequence by the phase constant and taking a conjugate based on the frequency-domain reference signal sequence. The operations of 2115 may be performed in accordance with examples as disclosed herein. In some examples, aspects of the operations of 2115 may be performed by a reference signal processing component 1535 as described with reference to FIG. 15.

At 2120, the method may include performing a channel estimation procedure to estimate a channel associated with the frequency-domain reference signal sequence. The operations of 2120 may be performed in accordance with examples as disclosed herein. In some examples, aspects of the operations of 2120 may be performed by a channel estimation component 1540 as described with reference to FIG. 15.

The following provides an overview of aspects of the present disclosure:

Aspect 1: A method for wireless communications at a transmitting device, comprising: generating a first time-domain reference signal sequence using a DFT of a first size associated with the first time-domain reference signal sequence, the first time-domain reference signal sequence comprising a first sequence length that is truncated to a second sequence length based at least in part on a modification of a header portion and a tail portion of the first time-domain reference signal sequence; performing the DFT on the truncated first time-domain reference signal sequence to generate a frequency-domain reference signal sequence associated with a phase constant; performing an IFFT on the frequency-domain reference signal sequence associated with the phase constant to generate a second time-domain reference signal sequence; and transmitting the second time-domain reference signal sequence.

Aspect 2: The method of aspect 1, wherein the addition of the header portion and the tail portion to the first time-domain reference signal sequence further comprises: truncating the first time-domain reference signal sequence using a first plurality of zero bits corresponding to the header portion and a second plurality of zero bits corresponding to the tail portion.

Aspect 3: The method of any of aspects 1 through 2, wherein the first time-domain reference signal sequence and the truncated first time-domain reference signal sequence are associated with a set of ZC properties, the method further comprising: performing the DFT on the truncated first time-domain reference signal sequence, wherein the set of ZC properties is unchanged between the truncated first time-domain reference signal sequence and an output of the DFT.

Aspect 4: The method of any of aspects 1 through 3, wherein performing the DFT on the truncated first time-domain reference signal sequence further comprises: generating the frequency-domain reference signal sequence via the DFT, wherein the frequency-domain reference signal sequence corresponds to a conjugate based on the truncated first time-domain reference signal sequence multiplied by the phase constant.

Aspect 5: The method of any of aspects 1 through 4, wherein performing the IFFT further comprises: reconstructing the first time-domain reference signal sequence associated with the phase constant based at least in part on performing the IFFT.

Aspect 6: The method of aspect 5, wherein the reconstructed first time-domain reference signal sequence comprises the second time-domain reference signal sequence and has a third sequence length that includes the header portion and the tail portion.

Aspect 7: The method of any of aspects 1 through 6, wherein the truncated first time-domain reference signal sequence comprises a short time-domain reference signal sequence generated to have the second sequence length, the method further comprising: performing the DFT on the short time-domain reference signal sequence to generate the frequency-domain reference signal sequence associated with the phase constant.

Aspect 8: The method of aspect 7, wherein performing the DFT on the short time-domain reference signal sequence further comprises: generating the frequency-domain reference signal sequence, wherein the frequency-domain reference signal sequence corresponds to a conjugate based on the short time-domain reference signal sequence multiplied by the phase constant.

Aspect 9: The method of any of aspects 1 through 8, wherein the first time-domain reference signal sequence corresponds to a DFT-s-OFDM waveform.

Aspect 10: The method of any of aspects 1 through 9, wherein the first time-domain reference signal sequence comprises a root sequence associated with the first sequence length.

Aspect 11: The method of any of aspects 1 through 10, wherein the first time-domain reference signal sequence, the truncated first time-domain reference signal sequence, and the frequency-domain reference signal sequence comprise ZC reference signal sequences.

Aspect 12: A method for wireless communications at a receiving device, comprising: receiving, from a transmitting device, a time-domain reference signal sequence comprising a first sequence that includes a header portion and a tail portion; performing a FFT on the time-domain reference signal sequence to generate a frequency-domain reference signal sequence associated with a phase constant; processing the frequency-domain reference signal sequence by dividing the frequency-domain reference signal sequence by the phase constant and taking a conjugate based on the frequency-domain reference signal sequence; and performing a channel estimation procedure to estimate a channel associated with the frequency-domain reference signal sequence.

Aspect 13: The method of aspect 12, wherein the header portion and the tail portion further comprise a first plurality of zero bits corresponding to the header portion and a second plurality of zero bits corresponding to the tail portion.

Aspect 14: The method of any of aspects 12 through 13, further comprising: performing the FFT on the time-domain reference signal sequence having a set of ZC properties, wherein the frequency-domain reference signal sequence is associated with the conjugate that is based on the time-domain reference signal sequence based at least in part on the set of ZC properties.

Aspect 15: The method of any of aspects 12 through 14, wherein performing the FFT on the time-domain reference signal sequence further comprises: generating the frequency-domain reference signal sequence via the FFT, wherein the frequency-domain reference signal sequence corresponds to the conjugate based on a truncated first time-domain reference signal sequence multiplied by the phase constant.

Aspect 16: The method of any of aspects 12 through 15, wherein the time-domain reference signal sequence corresponds to a DFT-s-OFDM waveform.

Aspect 17: The method of any of aspects 12 through 16, wherein the time-domain reference signal sequence and the frequency-domain reference signal sequence comprise ZC reference signal sequences.

Aspect 18: An apparatus for wireless communications at a transmitting device, comprising a processor; memory coupled with the processor; and instructions stored in the memory and executable by the processor to cause the apparatus to perform a method of any of aspects 1 through 11.

Aspect 19: An apparatus for wireless communications at a transmitting device, comprising at least one means for performing a method of any of aspects 1 through 11.

Aspect 20: A non-transitory computer-readable medium storing code for wireless communications at a transmitting device, the code comprising instructions executable by a processor to perform a method of any of aspects 1 through 11.

Aspect 21: An apparatus for wireless communications at a receiving device, comprising a processor; memory coupled with the processor; and instructions stored in the memory and executable by the processor to cause the apparatus to perform a method of any of aspects 12 through 17.

Aspect 22: An apparatus for wireless communications at a receiving device, comprising at least one means for performing a method of any of aspects 12 through 17.

Aspect 23: A non-transitory computer-readable medium storing code for wireless communications at a receiving device, the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a transmitting device, comprising:
a processor;
memory coupled with the processor; and
instructions stored in the memory and executable by the processor to cause the apparatus to:
generate a first time-domain reference signal sequence using a discrete Fourier transform of a first size associated with the first time-domain reference signal sequence, the first time-domain reference signal sequence comprising a first sequence length that is truncated to a second sequence length based at least in part on a modification of a header portion and a tail portion of the first time-domain reference signal sequence;
perform the discrete Fourier transform on the truncated first time-domain reference signal sequence to generate a frequency-domain reference signal sequence associated with a phase constant;
perform an inverse fast-Fourier transform on the frequency-domain reference signal sequence associated with the phase constant to generate a second time-domain reference signal sequence; and
transmit the second time-domain reference signal sequence.

2. The apparatus of claim 1, wherein the instructions to generate the first time-domain reference signal sequence are further executable by the processor to cause the apparatus to:
truncate the first time-domain reference signal sequence using a first plurality of zeros corresponding to the header portion and a second plurality of zeros corresponding to the tail portion.

3. The apparatus of claim 1, wherein the first time-domain reference signal sequence and the truncated first time-domain reference signal sequence are associated with a set of Zadoff-Chu properties, and the instructions are further executable by the processor to cause the apparatus to:
perform the discrete Fourier transform on the truncated first time-domain reference signal sequence, wherein the set of Zadoff-Chu properties is unchanged between the truncated first time-domain reference signal sequence and an output of the discrete Fourier transform.

4. The apparatus of claim 1, wherein the instructions to perform the discrete Fourier transform on the truncated first time-domain reference signal sequence are further executable by the processor to cause the apparatus to:
generate the frequency-domain reference signal sequence via the discrete Fourier transform, wherein the frequency-domain reference signal sequence corresponds to a conjugate based on the truncated first time-domain reference signal sequence multiplied by the phase constant.

5. The apparatus of claim 1, wherein the instructions to perform the inverse fast-Fourier transform are further executable by the processor to cause the apparatus to:
reconstruct the first time-domain reference signal sequence associated with the phase constant based at least in part on performing the inverse fast-Fourier transform.

6. The apparatus of claim 5, wherein the reconstructed first time-domain reference signal sequence comprises the second time-domain reference signal sequence and has a third sequence length that includes the header portion and the tail portion.

7. The apparatus of claim 1, wherein the truncated first time-domain reference signal sequence comprises a short time-domain reference signal sequence generated to have the second sequence length, and the instructions are further executable by the processor to cause the apparatus to:
perform the discrete Fourier transform on the short time-domain reference signal sequence to generate the frequency-domain reference signal sequence associated with the phase constant.

8. The apparatus of claim 7, wherein the instructions to perform the discrete Fourier transform on the short time-domain reference signal sequence are further executable by the processor to cause the apparatus to:
generate the frequency-domain reference signal sequence, wherein the frequency-domain reference signal sequence corresponds to a conjugate based on the short time-domain reference signal sequence multiplied by the phase constant.

9. The apparatus of claim 1, wherein the first time-domain reference signal sequence corresponds to a discrete Fourier transform-spread-orthogonal frequency division multiplexed waveform.

10. The apparatus of claim 1, wherein the first time-domain reference signal sequence comprises a root sequence associated with the first sequence length.

11. The apparatus of claim 1, wherein the first time-domain reference signal sequence, the truncated first time-domain reference signal sequence, and the frequency-domain reference signal sequence comprise Zadoff-Chu reference signal sequences.

12. An apparatus for wireless communications at a receiving device, comprising:
a processor;
memory coupled with the processor; and
instructions stored in the memory and executable by the processor to cause the apparatus to:
receive, from a transmitting device, a time-domain reference signal sequence comprising a first sequence that includes a header portion and a tail portion;
perform a fast Fourier transform on the time-domain reference signal sequence to generate a frequency-domain reference signal sequence associated with a phase constant;
process the frequency-domain reference signal sequence by dividing the frequency-domain reference signal sequence by the phase constant and taking a conjugate based on the frequency-domain reference signal sequence; and
perform a channel estimation procedure to estimate a channel associated with the frequency-domain reference signal sequence.

13. The apparatus of claim 12, wherein the header portion and the tail portion further comprise a first plurality of zeros corresponding to the header portion and a second plurality of zeros corresponding to the tail portion.

14. The apparatus of claim 12, wherein the instructions are further executable by the processor to cause the apparatus to:
perform the fast Fourier transform on the time-domain reference signal sequence having a set of Zadoff-Chu properties, wherein the frequency-domain reference signal sequence is associated with the conjugate that is based on the time-domain reference signal sequence based at least in part on the set of Zadoff-Chu properties.

15. The apparatus of claim 12, wherein the instructions to perform the fast Fourier transform on the time-domain reference signal sequence are further executable by the processor to cause the apparatus to:
generate the frequency-domain reference signal sequence via the fast Fourier transform, wherein the frequency-domain reference signal sequence corresponds to the conjugate based on a truncated first time-domain reference signal sequence multiplied by the phase constant.

16. The apparatus of claim 12, wherein the time-domain reference signal sequence corresponds to a discrete Fourier transform-spread-orthogonal frequency division multiplexed waveform.

17. The apparatus of claim 12, wherein:
the time-domain reference signal sequence and the frequency-domain reference signal sequence comprise Zadoff-Chu reference signal sequences.

18. A method for wireless communications at a transmitting device, comprising:
generating a first time-domain reference signal sequence using a discrete Fourier transform of a first size associated with the first time-domain reference signal sequence, the first time-domain reference signal sequence comprising a first sequence length that is truncated to a second sequence length based at least in part on a modification of a header portion and a tail portion of the first time-domain reference signal sequence;
performing the discrete Fourier transform on the truncated first time-domain reference signal sequence to generate a frequency-domain reference signal sequence associated with a phase constant;
performing an inverse fast-Fourier transform on the frequency-domain reference signal sequence associated with the phase constant to generate a second time-domain reference signal sequence; and
transmitting the second time-domain reference signal sequence.

19. The method of claim 18, wherein the addition of the header portion and the tail portion to the first time-domain reference signal sequence further comprises:
truncating the first time-domain reference signal sequence using a first plurality of zeros corresponding to the header portion and a second plurality of zeros corresponding to the tail portion.

20. The method of claim 18, wherein the first time-domain reference signal sequence and the truncated first time-domain reference signal sequence are associated with a set of Zadoff-Chu properties, the method further comprising:
performing the discrete Fourier transform on the truncated first time-domain reference signal sequence, wherein the set of Zadoff-Chu properties is unchanged between the truncated first time-domain reference signal sequence and an output of the discrete Fourier transform.

21. The method of claim 18, wherein performing the discrete Fourier transform on the truncated first time-domain reference signal sequence further comprises:
generating the frequency-domain reference signal sequence via the discrete Fourier transform, wherein the frequency-domain reference signal sequence corresponds to a conjugate based on the truncated first time-domain reference signal sequence multiplied by the phase constant.

22. The method of claim 18, wherein performing the inverse fast-Fourier transform further comprises:
reconstructing the first time-domain reference signal sequence associated with the phase constant based at least in part on performing the inverse fast-Fourier transform.

23. The method of claim 22, wherein the reconstructed first time-domain reference signal sequence comprises the second time-domain reference signal sequence and has a third sequence length that includes the header portion and the tail portion.

24. The method of claim 18, wherein the truncated first time-domain reference signal sequence comprises a short time-domain reference signal sequence generated to have the second sequence length, the method further comprising:
performing the discrete Fourier transform on the short time-domain reference signal sequence to generate the frequency-domain reference signal sequence associated with the phase constant.

25. The method of claim 24, wherein performing the discrete Fourier transform on the short time-domain reference signal sequence further comprises:
generating the frequency-domain reference signal sequence, wherein the frequency-domain reference signal sequence corresponds to a conjugate based on the short time-domain reference signal sequence multiplied by the phase constant.

26. The method of claim 18, wherein the first time-domain reference signal sequence corresponds to a discrete Fourier transform-spread-orthogonal frequency division multiplexed waveform.

27. The method of claim 18, wherein the first time-domain reference signal sequence comprises a root sequence associated with the first sequence length.

28. The method of claim 18, wherein the first time-domain reference signal sequence, the truncated first time-domain reference signal sequence, and the frequency-domain reference signal sequence comprise Zadoff-Chu reference signal sequences.

29. A method for wireless communications at a receiving device, comprising:
receiving, from a transmitting device, a time-domain reference signal sequence comprising a first sequence that includes a header portion and a tail portion;
performing a fast Fourier transform on the time-domain reference signal sequence to generate a frequency-domain reference signal sequence associated with a phase constant;
processing the frequency-domain reference signal sequence by dividing the frequency-domain reference signal sequence by the phase constant and taking a conjugate based on the frequency-domain reference signal sequence; and
performing a channel estimation procedure to estimate a channel associated with the frequency-domain reference signal sequence.

30. The method of claim 29, wherein the header portion and the tail portion further comprise a first plurality of zeros corresponding to the header portion and a second plurality of zeros corresponding to the tail portion.

* * * * *